United States Patent [19]

Plumer

[11] Patent Number: 5,711,581
[45] Date of Patent: Jan. 27, 1998

[54] WHEEL OPENING INSERTS AND LUG NUT ASSEMBLIES THEREOF FOR MOUNTING VEHICLE WHEELS

[76] Inventor: Mark J. Plumer, 980 Amalfi Dr., Pacific Palisades, Calif. 90272

[21] Appl. No.: 690,584

[22] Filed: Jul. 31, 1996

Related U.S. Application Data

[63] Continuation-in-part of Ser. No. 187,203, Jan. 27, 1994, Pat. No. 5,542,753.
[51] Int. Cl.$^6$ ........................................................ B60B 3/16
[52] U.S. Cl. ...................... 301/35.62; 301/65; 411/544; 411/917
[58] Field of Search .................... 301/63.1, 64.7, 301/65, 6.1, 6.91, 35.62; 411/368, 369, 370, 542, 544, 917

[56] References Cited

U.S. PATENT DOCUMENTS

| | | | |
|---|---|---|---|
| 3,556,570 | 1/1971 | Cosenza | 411/544 X |
| 3,659,901 | 5/1972 | Porsche et al. | 301/65 |
| 3,746,399 | 7/1973 | Verdier | 301/65 |
| 3,788,185 | 1/1974 | Gutshall | 411/369 X |
| 4,973,102 | 11/1990 | Bien | 411/368 X |
| 5,069,589 | 12/1991 | Lemke | 411/368 X |
| 5,401,079 | 3/1995 | Rooney | 301/65 X |
| 5,542,753 | 8/1996 | Plumer | 301/35.62 X |

FOREIGN PATENT DOCUMENTS

| | | | |
|---|---|---|---|
| 2163801 | 7/1987 | Japan | 301/35.62 |

*Primary Examiner*—Russell D. Stormer
*Attorney, Agent, or Firm*—Robert J. Schaap

[57] ABSTRACT

Vehicle wheel inserts adapted to extend into the stud-receiving openings of a vehicle wheel and particularly, a non-ferrous vehicle wheel and lug nut assemblies thereof. The inserts are effectively stamped from sheet metal, and are relatively thin and light in weight. The inserts are uniquely designed so that the inserts can be permanently locked in the stud-receiving openings of the vehicle wheel. The inserts are preferably, although not necessarily, provided with a ring flange and the peripheral edge of this ring flange engages a shoulder-forming wall in the stud-receiving opening to tightly retain the insert within the stud-receiving opening. In accordance with this construction, the inserts may be provided with a depending skirt but which does not provide any locking function for securing the inserts in the stud receiving openings. Further, it is not necessary to provide any depending skirt on the insert whatsoever. Not only are the inserts permanently affixed within the stud-receiving openings, they will also operate to bear against the lug nuts. In this way, a spring-type loading is imposed on the lug nut preventing an unauthorized vibrational unwinding of the lug nut. The insert will deflect when tightened against the wheel opening by a lug nut to thereby provide a Belleville spring effect.

57 Claims, 7 Drawing Sheets

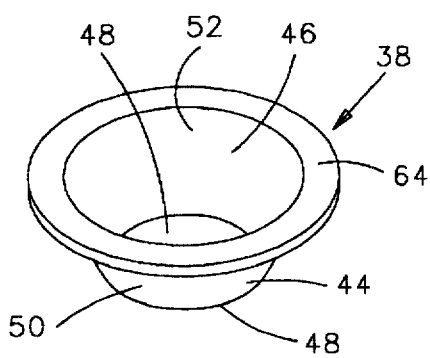
FIG.1
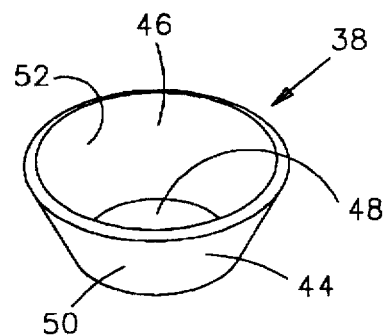
FIG.2
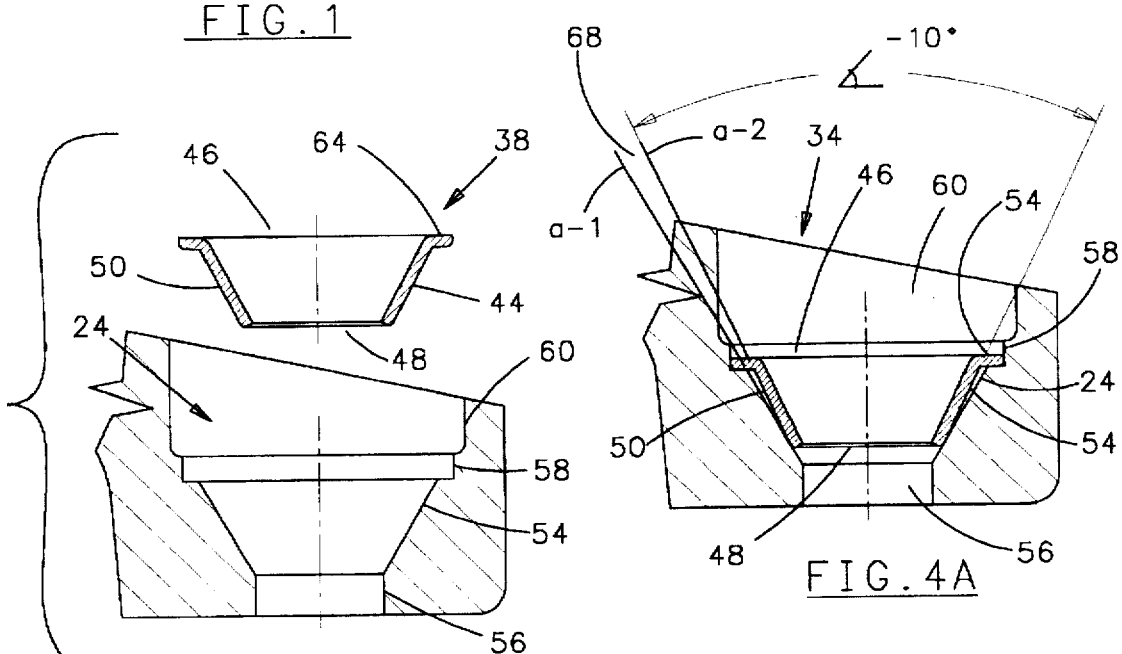
FIG.3
FIG.4A
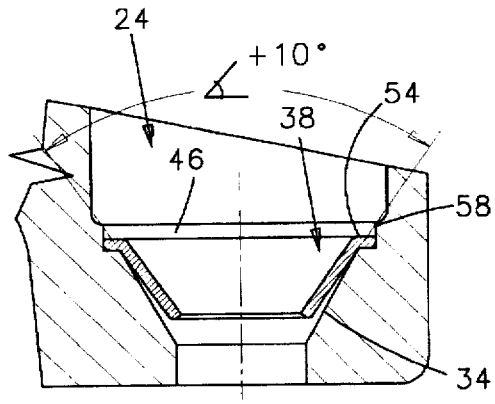
FIG.4B
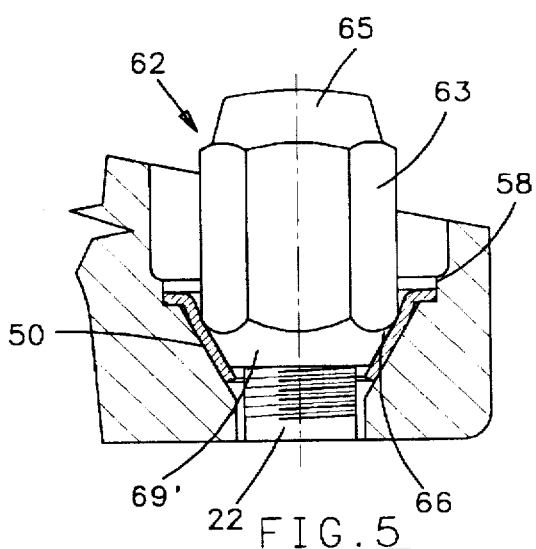
FIG.5

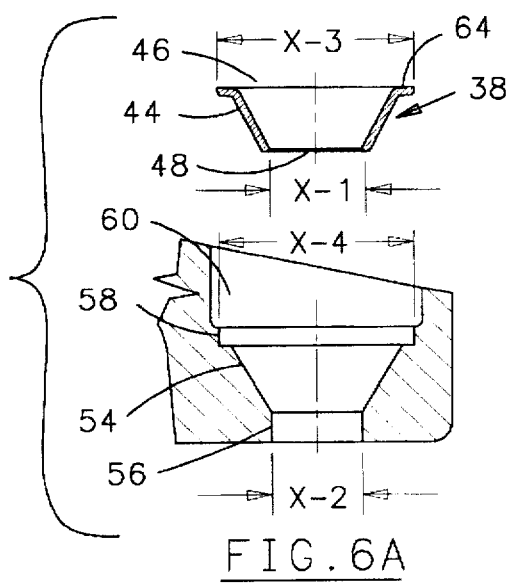
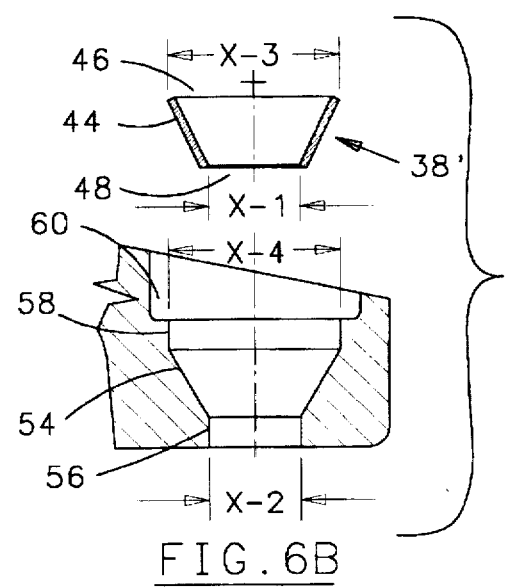
FIG.6A
FIG.6B
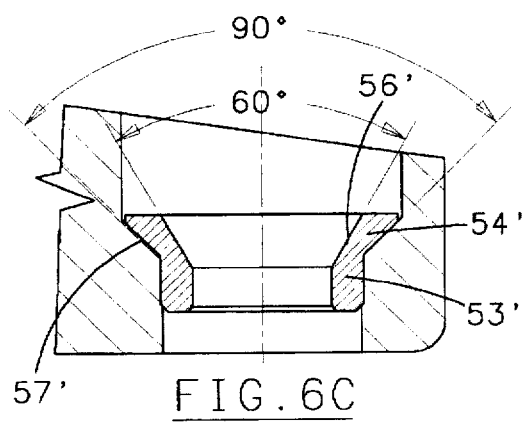
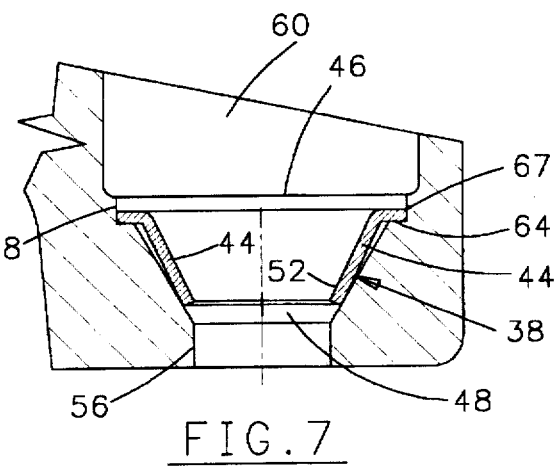
FIG.6C
FIG.7
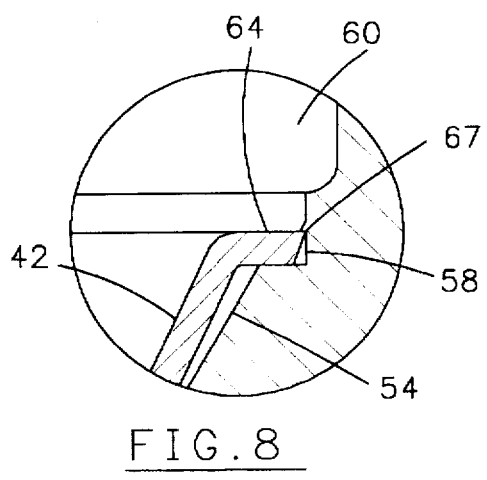
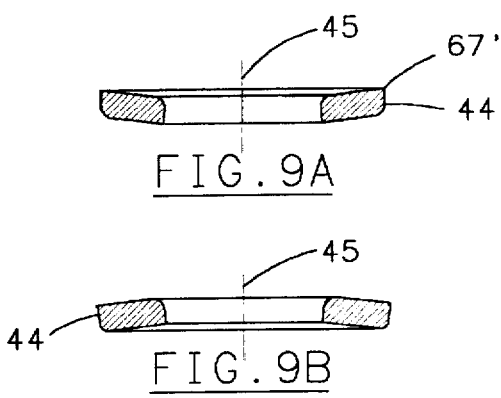
FIG.8
FIG.9A
FIG.9B

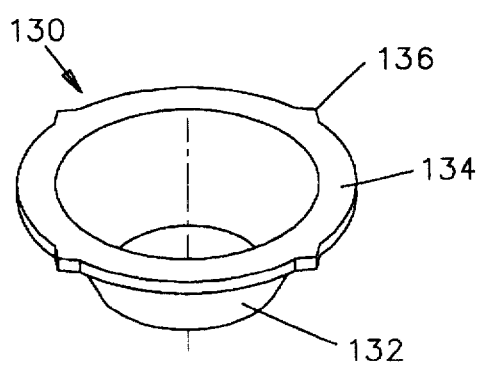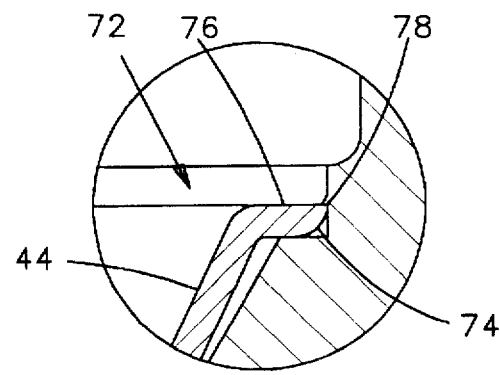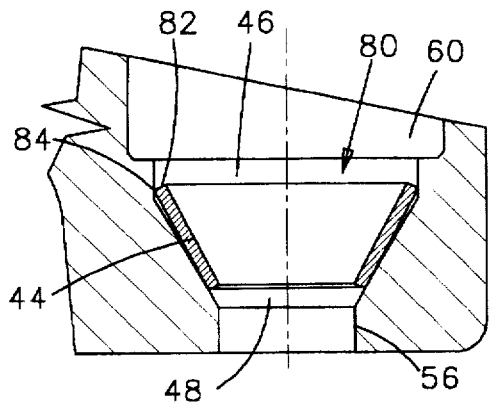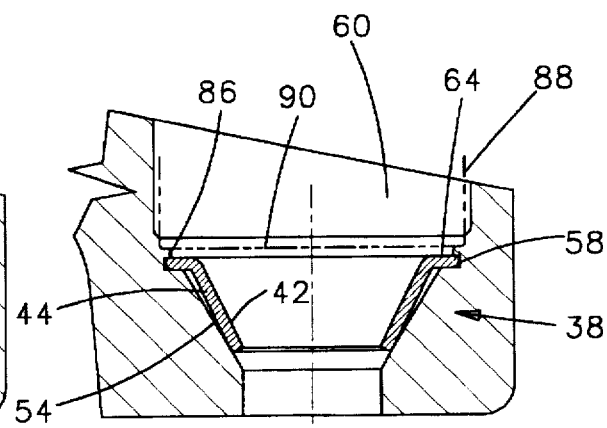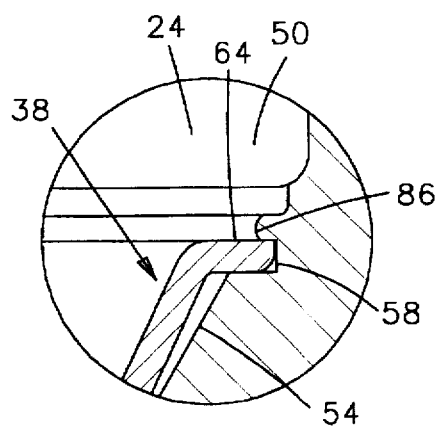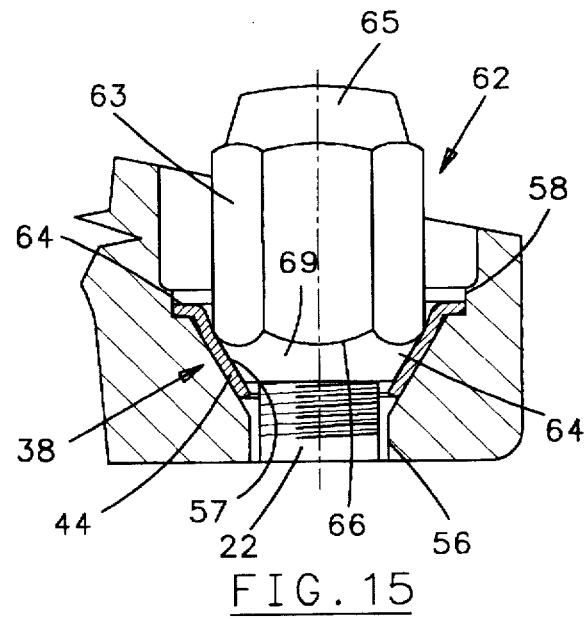

5,711,581

WHEEL OPENING INSERTS AND LUG NUT ASSEMBLIES THEREOF FOR MOUNTING VEHICLE WHEELS

RELATED APPLICATION

This application is a continuation-in-part of my U.S. patent application Ser. No. 08/187,203, filed Jan. 27, 1994 now U.S. Pat. No. 5,542,753 for "Wheel Opening Inserts and Lug Nut Assemblies Thereof for Mounting Non-Ferrous Vehicle Wheels".

BACKGROUND OF THE INVENTION

1. Field of the Invention

This invention relates in general to certain new and useful improvements in vehicle wheel inserts and lug nut assemblies thereof, and more particularly, to such vehicle wheel inserts which are in cooperative relationship with lug nuts in non-ferrous wheels for ensuring a precise and accurate tightening of the wheel against the vehicle hub without any damage to the vehicle wheel and which precludes unauthorized vibrational unwinding of the lug nuts.

2. Brief Description of the Prior Art

In recent years, automobile manufacturers have resorted to the production of non-ferrous wheels for motor vehicles and particularly, wheels made of aluminum and magnesium. In addition, wheels which are made of non-ferrous materials are frequently offered in the automotive aftermarket for purposes of customizing a vehicle. As a result of their light weight and attractive appearance, non-ferrous wheels have thereby become popularized. Accordingly, many automotive enthusiasts will therefore substitute these non-ferrous wheels for the conventionally provided steel vehicle wheel.

The primary purpose of an insert for use in a non-steel wheel is to provide a steel surface for the steel lug nut to seat against. In this way, the steel lug nut will not damage the lug nut seat, that is the seat cast and machined in the aluminum wheel. Equally important is the fact that the insert will also maintain a constant torque-tension curve, that is, it will maintain a constant clamping force between the lug nut and the wheel. At the present time, inserts are now being used in aluminum wheels by many of the automobile manufacturers in the United States and Japan. Generally, the only companies which do not use inserts in the wheels are those which are either attempting to economize or otherwise who are actually unaware of the significant advantages of the steel insert in the non-ferrous wheel.

There are also other areas in which inserts could be used but which are avoided because of the high cost thereof. As a simple example, many wheel manufacturers have attempted to produce wheels that would fit differing stud patterns. Certain automobile manufacturers in the United States, for example, use different stud patterns and hence the stud-receiving hold patterns in wheels of one vehicle are different from the stud-receiving patterns on the wheels of another vehicle. Certain wheel manufacturers, and particularly after market wheel manufacturers, have attempted to employ dual wheel pattern holes in these wheels so that they would be adaptable for use on the vehicles of the different manufacturers. However, for this purpose, and particularly with the aluminum wheels, inserts would be highly desirable. However, most wheel manufacturers have avoided the use of these inserts primarily because of the significant costs thereof and the fact that the removal of metal to form a dense hole pattern substantially weakened the wheel, thereby militating against its use.

One of the major problems with the use of non-ferrous wheels, such as aluminum wheels, when no inserts are used, is the fact that the lug nuts have a tendency to become loose from vibrational effects and as a result of wear resulting from the steel lug nut rubbing against the softer aluminum seat during wheel rotation. The flexing of a wheel mounting stud normally occurs due to vibrations resulting from road conditions, wheel braking, sudden acceleration with resultant movement between the lug nut and the soft aluminum seat. This results in significant wear on the aluminum seat and also causes the corners of the hexagonal portion of the lug nut to literally dig into the soft aluminum seat.

Steel inserts have been used in the stud-receiving openings of non-ferrous wheels in order to eliminate some of the deformation of the aluminum or other non-ferrous wheel when a lug nut is tightened against the wheel. These inserts are all provided with integral skirts and the skirts are provided with a knurled surface on the exterior wall of the cylindrically shaped skirt. In this way, the conical section of the insert fits within the conically shaped portion of the stud-receiving opening and the cylindrically shaped skirt fits within the cylindrically shaped portion of the stud-receiving opening.

In essentially all prior art vehicle wheel inserts, a depending skirt on the insert was used to lock the insert in the stud-receiving opening. Very often, the cylindrically shaped skirt was used to provide this locking action by virtue of a frictional fit of the skirt against the side wall of the stud-receiving opening. In all cases, the exterior side wall of the skirt was provided with a knurled surface configuration so as to provide a tighter frictional fit within the stud-receiving opening and to also reduce the tolerance requirements. Here again, even the knurled surface on the exterior surface of the insert was not sufficient if dimensional accuracy was not present.

One of the principal problems with the use of this type of insert is the fact that it is necessary to literally machine the knurled surface or other serrations on the exterior wall of the skirt. Moreover, these prior art inserts were never stamped from thin sheet metal, due to the need of the skirt and particularly, the knurling on the exterior surface thereof.

The majority of the prior art wheel inserts generally have a conically shaped seating section or body with a size such that the exterior wall of the body is tapered at an included angle of 90 degrees. In other words, the seating surface for the insert in the stud-receiving opening has an angle of 45° with respect to an axial centerline so that two opposite sides of the stud-receiving opening seating surface define an included angle of 90°. However, the included angle of the inner surface which receives the lug nut, that is, the lug nut seating surface, is generally only 60 degrees. Thus, the exterior conical surface of the insert is never used to retain the insert in the wheel. Moreover, even if a flange was also provided at the upper end of the insert body, clearance is provided between the exterior face of the conically shaped body on the seating section of the insert. This clearance was always provided between the edge of the flange and the shoulder of the stud-receiving opening to allow a skirt to hold the insert. In this way, the flange was never used to retain the insert in the stud-receiving opening, but rather reliance was made upon the knurled skirt to accomplish that end.

Inasmuch as these prior art inserts have been formed of forged steel or machined, they weigh as much as four to six times the amount of weight of an insert which is formed of a sheet metal in a simple stamping operation. The prior art inserts are typically made on screw machines or headers and generally about twenty seven finished pieces having a weight of about one pound are produced, whereas, with the inserts of the present invention, as hereinafter described, about one hundred and sixty pieces have the weight of one pound. Due to the fact that there is a substantial decrease in weight by using a stamped sheet metal insert, there is far less possibility of wheel imbalance occurring. In addition, it is far less costly to produce a vehicle wheel insert in a stamping operation than in a conventional forging and machining operation.

Another one of the major problems in connection with the prior art inserts is that they effectively change the stud-receiving hole location as a result of the eccentricity between the seating surface in the insert cavity, that is, the stud-receiving opening, since the concentricity of the interior surface of the insert is not the same as that of the exterior surface. Many major automotive manufacturers call for a maximum eccentricity of no greater than 0.002 Total Indicated Reading (T.I.R.) and generally a simple measurement will show that the eccentricity is usually well in excess of 0.005 T.I.R. In order to maintain a T.I.R. of 0.002, total cost of manufacture of the insert is materially increased when produced by the conventional machining and forging operations.

The prior art inserts actually interfere with a true centering of the wheel with respect to the studs. When an insert having a skirt with a knurl on its exterior face is pressed into a stud-receiving opening of a wheel with an interference fit, the insert may not have a centerline concentric with that of the stud-receiving opening it is pressed into. Indeed, the greater the interference fit which is provided between the opening and the insert, the greater the offset between the centerline of the insert and the centerline of the opening will be. This lack of concentricity will literally cause the lug nut to be shifted out of a concentric location in the insert and cause a stressing of the stud or otherwise, a resultant bending of the stud. The shifting of the lug nut may also cause a scraping of the metal forming the stud-receiving opening or so-called "snow-plowing".

When the lug nut does not properly fit on the stud inaccurate wheel location results. This can produce wheel imbalance, and for that matter, stress cracks in the wheel itself. Moreover, this condition will overstress the mounting studs. As a result, catastrophic destruction can also occur after a period of time.

When the inserts are made on a progressive header, or a screw machine, concentricity is difficult to maintain. On a header, the part is formed from a piece of metal, that is effectively forced into a shape with a force of as much as 150 to 200 tons. Factors which will affect the concentricity of the insert include punch alignment, metal flow, temperature and the like. On a screw machine, the concentricity is dependent on spindle bearings and whether or not the carrier locates the spindles in a proper position. It is also dependent on whether or not the form drills are fixed or floating. Thus, numerous factors will effect the concentricity an insert can maintain in a stud-receiving opening.

In the case of standard OEM steel wheels, a torsion ring is used to retain the lug nut. The steel wheels are frequently constructed so that a portion of the wheel surrounding the stud-receiving opening actually functions as a type of torsion ring. This creates a Belleville spring effect. Thus, when a lug nut is tightened against a steel wheel, the wheel surface around the lug nut will actually deflect slightly, causing a spring loading on the lug nut. This spring loading or Belleville effect actually places the lug nut under a compressive force loading on the vehicle wheel stud and prevents the lug nut from vibrating loose on the vehicle wheel stud.

There have been several attempts to duplicate the torsion ring effect of steel wheels in the manufacture of aluminum and other non-ferrous wheels. However, these attempts have not been shown to be effective, particularly in the case of aluminum wheels. Aluminum, in particular, is not a desirable spring material. Furthermore, the thickness of the aluminum wheel in the lug nut mounting area, that is, around the stud-receiving holes, is actually four times thicker then in a corresponding steel wheel. As a result, the aluminum wheel manufacturers were not able to obtain any significant effective Belleville spring effect. A mild Belleville effect was obtained by adding a step surrounding the stud-receiving opening in the non-ferrous wheel. However, this Belleville spring effect was not significant and the step resulted in other problems, such that most companies will not use an aluminum wheel having a step surrounding the stud-receiving opening.

In order to improve the aesthetics of the wheel mounting arrangement, many users of non-ferrous wheels will employ chrome plated lug nuts for securing the wheel on the vehicle studs. However, when a chrome plated lug nut having an exterior conically shaped surface is tightened onto a conically shaped aluminum surface, the chrome on the lug nut will gall the aluminum seating surface. This galling of the aluminum seat effectively destroys the seat and particularly, the ability to accurately center the wheel with respect to the studs. This problem has been observed by many major automotive manufacturers and, as a result, these manufacturers have written specifications to allow for some galling of the aluminum wheel. Other automotive vehicle manufacturers prohibit the use of, or strongly recommend against the use of chrome plated lug nuts on aluminum and other non-ferrous wheels.

Wheel inserts which are presently used on aluminum wheels are made on headers and screw machines, as aforesaid. The header used to manufacture an insert is a very expensive piece of equipment with a cost easily exceeding $1,000,000.00. In addition, the initial tooling costs alone are $30,000.00. The cost of a screw machine is less although production is not nearly as efficient. In some of the inserts used in foreign manufactured wheels, an undercut is formed between the seating section and the skirt, and this alone requires a separate machining operation when made on a header.

Most of the prior art wheel inserts are typically made on either a header or a screw machine, as aforesaid. However, when an undercut is required on the insert, which may occur in certain applications, a second operation is required when the insert is made on a header, as aforesaid. As a result, economy of production is drastically reduced when additional machining operations are required, as with a header. With a screw machine, the production time is considerably longer than with an insert made on a header. Also, because of the better finish, most purchasers of the inserts prefer the finish of the insert when made on a header.

The applicant has taught of the use of inserts in vehicle wheel nut assemblies for securing non-ferrous wheels to the hub of a vehicle as, for example, in U.S. Pat. No. 4,898,429 dated Feb. 6, 1990 for "Vehicle Wheel Assembly." However, the inserts taught in this U.S. patent all required the use of a cylindrically shaped skirt portion surrounding the conical seat. Moreover, this invention taught the use of lug nuts, each having a body section with tool-engaging walls and a skirt located on and extending axially from the tool engaging wall of the lug nuts. However, in accordance with the invention in this U.S. Pat. No. 4,898,429, and due to the fact that the lug nuts were of a different construction, a means to retain the insert in the stud-receiving opening was not addressed.

Others have proposed the use of inserts in vehicle wheels as, for example, in U.S. Pat. No. 3,329,468 dated Jul. 4, 1967 for Wheel Structure, U.S. Pat. No. 3,811,737, dated May 21, 1974 for a Reinforced Resin Wheel, U.S. Pat. No. 4,679,860 dated Jul. 14, 1987 for a Wheel Assembly For Vehicle, and U.S. Pat. No. 3,988,038 dated Oct. 26, 1976 for a Universal Wheel System. Other prior art wheel inserts have been taught in Offenlegungsschrift No. 2026332 dated Dec. 17, 1970 and Japanese Pat. No. 60-197101 for Built-Up Wheel for Vehicles, by Honda Giken Nogyokk.

There has been a need for some arrangement, including a steel insert which would allow the use of a steel lug nut for securing a non-ferrous wheel to the wheel hub of a vehicle. The use of this insert would provide a torsion ring effect for an aluminum wheel and thereby prevent the lug nuts from becoming loose as a result of vibrational effects on the wheel. In like manner, it would be desirable to use some type of steel insert to eliminate the destruction of the aluminum seat surrounding the wheel stud when a steel lug nut is tightened against the aluminum wheel. It is also desirable to allow the use of plated lug nuts, e.g., chrome plated lug nuts for securing the wheel to a wheel hub of a vehicle.

OBJECTS OF THE INVENTION

It is, therefore, one of the primary objects of the present invention to provide a wheel nut arrangement which allows the use of a steel lug nut for securing a non-ferrous wheel to the hub of a vehicle and which allows for a positive locking action of the insert within a stud-receiving opening of a non-ferrous wheel.

It is another object of the present invention to provide a vehicle wheel insert for mounting in the lug nut opening of a vehicle wheel and which is provided with a unique locking ring arrangement for retentively locking the insert within the stud-receiving opening of a vehicle wheel.

It is also an object of the present invention to provide a vehicle wheel insert of the type stated which prevents lug nuts from loosening during wheel vibration and which also precludes inadvertent dislodging of the insert when the vehicle wheel is inserted on the studs projecting from a vehicle hub.

It is a further object of the present invention to provide a wheel insert of the type stated which allows for the tightening of a vehicle wheel lug nut to secure a non-ferrous wheel to a vehicle hub without destroying the soft aluminum conically shaped seat and hence, the accuracy of the seat in a non-ferrous wheel.

It is yet another object of the present invention to provide a lug nut arrangement which allows for the use of an insert capable of being manufactured at a very low cost and which can be effectively stamped from stock sheet metal material.

It is another salient object of the present invention to provide a lug nut arrangement of the type stated which is highly effective in use and which can be used with a wide variety of different types of non-ferrous wheels.

It is still a further object of the present invention to provide an insert in which there is a minimal concentricity error between the seating surface in the stud-receiving opening of a vehicle wheel and the surface of an insert against which the lug nut seats as a result of forming the insert from sheet metal.

It is still another object of the present invention to provide a lug nut arrangement utilizing an insert and in which the stud-receiving opening at the surface facing the wheel hub has a small diametral size than the lower end of the insert such that the stud cannot knock the insert out of the stud-receiving opening.

It is still another important object of the present invention to provide an insert of the type stated in which a serrated flange on the insert will allow the insert to move within the stud-receiving opening so that the insert conforms precisely to the centerline of the stud-receiving opening even if there were any concentricity error between the insert and the stud-receiving opening.

It is still a further salient object of the present invention to provide an insert of the type stated which allows for the provision of a torsion ring effect when a lug nut bears against the insert and thereby maintains a tightening action of the lug nut on the studs of the vehicle.

It is still another object of the present invention to provide a method of securing a non-ferrous vehicle wheel to a wheel hub of a vehicle by the use of steel lug nuts without galling or otherwise destroying the vehicle wheel seat.

With the above and other objects in view, my invention resides in the novel features of form, construction, arrangement and combination of parts presently described and pointed out in the claims.

BRIEF SUMMARY OF THE DISCLOSURE

A vehicle lug nut arrangement in the form of an assembly comprised of at least a frusto-conically shaped insert and a lug nut for tightening the vehicle wheel on a vehicle stud projecting through a stud-receiving opening of the wheel. The invention is highly effective for the use of a steel insert in securing a non-ferrous wheel to the steel hub of the vehicle.

The use of a steel insert allows a torsion ring effect which would not otherwise be achievable in an aluminum or similar non-ferrous wheel. The insert becomes adhered to the wall of the stud-receiving opening and will operate as a surface against which the steel lug nut may bear. In a preferred embodiment, the insert deflects against the wheel opening by the force of the lug nut tightened on the stud to thereby provide a Belleville spring effect. Thus, a spring-type loading is imposed on the lug nut which prevents an unauthorized vibrational unwinding of the lug nut.

In the case of the present invention, steel inserts are employed, although it should be understood that other metal inserts could be used. It is preferable, but not necessary, in connection with the present invention to use an insert which has a hardness greater than that of the wheel. The non-ferrous wheel is typically formed of a soft material such as aluminum or the like. However, some aluminum materials can actually have a hardness greater than steel.

The non-ferrous wheel typically has a much greater cross sectional thickness than does the steel wheel. However, this thickness also results in a shorter protruding stem length of threaded stud for securement of a lug nut. As a result, there is a much greater tendency for a lug nut to become vibrationally unwound from the end of the stud when securing a non-ferrous wheel to the hub of the vehicle. The Belleville spring effect which actually imposes a force on the nut, effectively clamps the nut on the stud to thereby preclude an unwanted vibrational unwinding.

The inserts of the present invention have numerous advantages, which will become more fully apparent, compared to the inserts of the prior art. Initially, the inserts of the invention are approximately eighty percent (80%) lighter than any insert presently known and used in the prior art. In addition, the inserts of the present invention are uniquely designed with a constant cross sectional thickness throughout the body or so-called "nose portion". As a result, when the insert is inserted in a stud-receiving opening, it will conform precisely to the existing stud-receiving opening. In most cases, the stud-receiving opening has a conically shaped opening or hole and the insert itself has an existing conically shaped body. The insert has essentially no concentricity error. Contrariwise, essentially all of the prior art inserts have a very large concentricity error. The insert of the present invention will therefore eliminate the off-center problems which are associated with inserts press-fitted into a stud-receiving opening and using a knurled skirt to maintain the insert.

The inserts of the present invention will maintain location accuracy in the stud-receiving opening essentially throughout the life of the wheel and this is true regardless of whether or not the wheel suffers repeated installation and tire changes. In addition, it is well known that chrome plated lug nuts, which are quite popular, will gall or scar the surface of an aluminum wheel and for that matter, the lug nut will often gall and scar when tightened against a steel wheel. However, as a result of the construction of the insert of the present invention, the insert will preclude galling or scarring of the wheel by a chrome lug nut and thus, the lug nut itself will not thereby interfere with precision seating. As a result, the insert of the invention maintains a precision seat for the lug nuts. It should be noted in this respect that all aluminum, or other non-ferrous wheels, without inserts will become permanently deformed in a relatively short period of time with repeated installations and particularly with improper installations.

The inserts of the present invention are constructed with a relatively thin cross sectional thickness, as aforesaid, and equally importantly, with a constant cross sectional thickness throughout the entire body of the insert. Moreover, the ring flange on the insert itself also has a constant cross sectional thickness. This construction of the insert will maintain wheel balance as a result of consistent and accurate wheel location using these inserts. This also makes the wheel safer by reducing the otherwise resultant causes of the wheel becoming loosened.

The inserts of the invention may be provided with a depending skirt, as for example, a cylindrically shaped skirt. However, when provided with a skirt, that skirt typically does not provide any locking action for holding the insert within the stud receiving opening. However, more preferably, the insert does not require use of a skirt, as hereinafter described in more detail, and it can also be used with skirted conical lug nuts for precision wheel location. Moreover, they can be used with any standard sixty degree conical nose lug nut, or for that matter, lug nuts having any other angular conical nose portion. The insert, however, must naturally be constructed to conform to, and consistent with the nose of the lug nut and moreover, the insert must be constructed so as to conform to the stud-receiving opening in the wheel. The inserts of the invention will allow the lug nut to transmit a greater and consistent clamping force on the wheel. This is due to the fact that the thin walled construction of the insert allows some flexibility and yielding of the insert. Indeed, the more that the insert is used, the better it becomes as a result of work hardening.

The insert itself is constructed so that it has a lower end, that is, an end facing the hub, which has a diameter greater than the actual stud-receiving opening. As a result, this will preclude the insert from becoming dislodged from the stud-receiving opening. In other words, a stud cannot knock the insert out of the stud-receiving opening regardless of how hard a wheel may be thrown onto the studs during a mounting operation.

Due to the fact that the inserts are of extreme light weight and small, they will not weaken a wheel, which can result with other prior art inserts. As a result, the inserts of the present invention are ideal for use on multi-pattern wheels. Further, there is no need to use a heat treated lug nut with the insert of the invention.

The construction of the insert which achieves these advantages is hereinafter described, even in this general description, at least in broad terms, to demonstrate how these unique advantages are obtained.

The vehicle wheel insert is disposed in the stud-receiving opening of the non-ferrous vehicle wheel. In most cases, the insert is comprised of a continuous frusto-conically shaped body section which is adapted for fitted disposition into the conically shaped portion of a stud-receiving opening of this vehicle wheel. The body section terminates in a circular upper opening and a circular lower opening to allow a vehicle wheel stud to extend therethrough. In some cases, the inserts are circularly shaped and have a somewhat spherically shaped seating section for receiving the head of a bolt.

Each of the inserts of the present invention are preferably formed in a stamping operation and are preferably formed in a sheet metal stamping operation. In this way, for normal passenger automobiles, the inserts have a very thin cross sectional thickness, typically in the range of about 0.047 to about 125 mils. The prior art inserts, in contrast, have an average thickness of at least four to five times the thickness of the inserts of the present invention. Moreover, they also have a weight of at least four to six times the weight of the insert of the present invention.

Due to the fact that the insert of the invention is essentially flexible because of its relatively thin overall body thickness, it has the capability of deflecting slightly when a lug nut is tightened against the insert. This allows for the Belleville spring effect mentioned above. In addition, and more importantly, it also provides for a greater tightening action against the stud-receiving opening in the vehicle wheel. Thus, the insert can literally deflect to bind against the stud-receiving opening.

In the preferred embodiment of the steel insert, the upper opening is sized to accommodate a lug nut which is to be secured to a stud extending through the upper and lower openings and allows the lug nut to bear against a surface of the body section of the insert. The insert has a conically shaped body which is tightly fitted within the frusto-conically shaped portion of a stud-receiving opening. The body also has an exterior surface which engages and conforms to an interior surface of the frusto-conically shaped portion of the stud-receiving opening.

The inserts of the invention are primarily used with steel lug nuts. In this case, the lug nuts conventionally have a tool-receiving section and a tapered section extending axially outwardly from the tool receiving section. The tapered section is conically shaped and has a surface which is sized to extend into and conforms to an interior surface of the insert body. In effect, the combination of the lug nut and the insert operate as a locking means to cause the insert to be tightly locked in the stud-receiving opening. As the lug nut is tightened on the stud, the tapered end of the lug nut bears against the insert and literally forces the same into tight contact with the frusto-conically shaped surface of the stud-receiving opening. When in this position, the insert can also provide a torsion ring effect and creates a Belleville-type spring effect which bears against the lug nut.

Another one of the important aspects of the present invention is the fact that there are several unique locking means for permanently physically locking the insert within the stud-receiving opening of the wheel. In the prior art wheel inserts, a depending skirt on the lower end of the insert head was used to provide a locking action between the insert and the stud-receiving opening, as previously described. However, this locking action was not effective due to the fact that tolerances were typically not maintained and the inserts would frequently fall out of the stud-receiving openings. In addition, the overall length of the skirt itself presented a problem in that the end of the skirt would often times bear against the hub of the vehicle and thereby interfere with the tightening action of the vehicle wheel. In effect, the lug nut became tightened against the hub through the action of the insert, although the vehicle wheel itself did not become tightened and hence the vehicle wheel would vibrate on the studs projecting from the hub, resulting in severe damage to the wheel and perhaps even dislodging of the wheel from the hub.

The present invention utilizes an annular ring flange in one of the preferred embodiments and where the ring flange effectively provides the entire locking action for holding the insert in the stud receiving opening. Several embodiments of locking the ring flange within the stud-receiving opening are disclosed herein. In one of these embodiments, the insert may be created with an upper annular edge which creates an interference with the wall of the stud-receiving opening thereby permanently locking the insert in the stud-receiving opening. In another embodiment, the insert may be physically locked within the stud-receiving opening by means of a staking. In this case, a steel or other hard metal tool or member is used to strike the portion of the wheel surrounding the stud-receiving opening and deform the wheel to thereby literally encapsulate the rim of the insert in the stud-receiving opening.

In still another embodiment, a swaging effect is employed. The insert may initially be provided with a skirt and a metal tool, or other implement, which is preferably conically shaped, is used to strike the lower end of the skirt on the interior wall thereof, thereby flaring the end of the skirt so that it is effectively swaged to the wheel.

Each of the aforesaid modes of locking the insert in the stud-receiving opening are highly effective in that they preclude the insert from becoming removed from the opening. Notwithstanding, even without the aforesaid locking means, the insert effectively becomes locked in the stud-receiving opening of the wheel by virtue of the fact that it deflects against and essentially conforms to the wall, and particularly the conically shaped wall, of the stud-receiving opening. This literally creates a tight fit whereby the insert is retentively held within the stud-receiving openings.

By virtue of using the aforesaid locking techniques, it is also possible to literally stamp the insert from sheet metal at a relatively low cost. Consequently, it is not necessary to use a considerably more expensive and the considerably high weight insert form of forged steel and which in many cases requires additional machining operations. In addition, it is possible to avoid the more labor intensive and time consuming operations to produce the prior art inserts.

Another one of the unique advantages achieved by the locking means described herein is the fact that the insert itself is of a light weight sheet metal thin-walled construction. This actually increases the overall performance of the wheel in that the heavy weight of the steel inserts which often leads to unbalancing of the wheel is completely avoided.

Although the insert of the invention can be staked in the stud-receiving opening, the upper circular flange can aid such that the soft aluminum metal is deformed over the flange. As indicated above, staking can still result without the flange. Further, and while an interference effect of the type described above can be created without the flange, the interference locking effect can also result using the edge of the flange to create an interference between the surface of the wheel surrounding the stud-receiving opening and the edge of the flange.

In a preferred embodiment of the invention, the flange on the insert can be provided with a plurality of recesses or serrations so that the peripheral edge of the flange can effectively bit into the soft aluminum metal. In essence, any type of projection which has the provision of a sharp biting edge on the outer annular wall of the ring flange and which can effectively bite into the softer aluminum metal, can be used. Thus, a plurality of teeth-like projections has been found to be highly effective. These actual serrations, even in the absence of any other type of locking action, has been found to be more than sufficient in tightly retaining the insert within the stud-receiving openings. In these cases, the edge of the ring flange engages against and provides a locking action with a shoulder-forming wall surrounding the outer portion of the stud-receiving opening. In addition, this type of ring flange construction will preclude rotation of the insert when the steel lug nut is threadedly rotated on the stud projecting through the stud-receiving opening.

The insert is effective when tightly held in the opening, due to the fact that it may be deflected to cause a locking action in the stud-receiving opening. This deflection is caused by the lower portion of the lug nut, and particularly the tapered section which bears against the insert. However, this also creates a type of Belleville-type spring effect which operates against the lug nut itself, causing the same to remain tightly secured on the threaded stud.

One of the very important features of the insert of the present invention is the fact that it does not at all change the location of the stud-receiving opening and in addition, conforms precisely to the existing conical surface in the stud-receiving opening of the wheel. In contrast, essentially all prior art inserts change the stud-receiving opening location because of the eccentricity between the seating surface on the insert and the seating surface which receives the lug nut. This problem has been completely eliminated in accordance with the present invention, as described above.

The insert of the present invention is the only known insert that does not change the opening location when installed because it conforms precisely to the existing conically shaped hole in the wheel. It has no practical concentricity error and it eliminates the off-center problems associated with a knurled press-fit. The insert of the present invention also maintains location accuracy throughout the life of the wheel regardless of repeated installations, tire changes and the like. The insert will not gall or scar an aluminum wheel and further will maintain a precision seat for the lug nut. All aluminum wheels without the inserts can become permanently deformed with repeated or improper installations.

The inserts of the invention also maintain wheel balance because of consistent accurate wheel location. This makes the wheel safer by reducing the causes of wheel loosening. The insert of the invention can also be used with skirted conical lug nuts for precision mounting. They can also be used with any standard sixty degree conical nose lug nut, and for that matter with lug nuts having any angular conical nose. However, in all cases, the insert must be designed for use with the lug nut and for use with the stud-receiving opening in which it is to be used. The torque on the lug nut will transmit a greater and consisting clamping force on the wheel when the insert of the present invention is used. Indeed, the more the insert is used, the better it performs due to the work hardening effect on the steel.

There are two effects of mounting of a wheel on a hub of a vehicle which may be achieved. In one case, the axle receiving opening is concentric with the axis of the axle such that the wheel fits directly on the axle. In the typical after market wheels, they are frequently mounted so that the studs align with the stud receiving openings. In this case, the hub does not necessarily locate the wheel with respect to the hub. For this purpose, skirted lug nuts are effective.

The insert of the present invention may have an angle which precisely conforms to the angle of the conically shaped seating section or seat of the wheel. More preferably, the insert has an angle which is slightly displaced from that of the angle of the seat. The angle of the insert may vary from up to about 15 degrees relative to the angle of the seat and preferably within the range of about 12 degrees. In several embodiments shown, the insert has an angle with respect to the axial center-line passing through the stud receiving opening which is approximately 10 to 12 degrees greater than that of the included angle of the seat. Thus, if the seat has an angle of e.g. 60 degrees, the insert may have an inclusive angle of 70 to 72 degrees. In like manner, it is also possible for the insert to have a positive angle with respect to the seat in the stud receiving opening. Thus, when the lug nut is tightened against the insert, it will effectively crunch against the seat, thereby creating a positive locking action.

Another very significant advantage of the insert of the present invention is the fact that the stud cannot knock the insert out of the stud-receiving opening regardless of how hard a wheel is thrown onto the studs when mounting the wheel. This is due to the fact that there is no end of the insert which has a diameter less than that of the stud-receiving opening.

The insert of the present invention is also ideally suited for use in multi-pattern wheels, that is, wheels having different patterns of lug nut openings to accommodate different stud mounting arrangements. This is due to the fact that the inserts are extremely light in weight and reactively small. As a result, they do not weaken the soft aluminum wheel since only very little material is removed for the use of the insert. In addition to the foregoing, there is no need to use heat treated lug nuts when using the inserts of the present invention.

In accordance with the present invention, it can be seen in summary that:

1. The inserts of the invention are approximately 80% lighter than any insert known in the prior art;
2. The inserts of the invention do not change the hole location when installed due to the fact that they conform precisely to the existing conical hole in the wheel and they have practically no concentricity error and further they eliminate the off-centering problems associated with a skirted knurled press-fit insert;
2. The inserts of the invention maintain location accuracy throughout the life of the wheel regardless of repeated installations and tire changes due to the fact that the insert will not gall or scar the aluminum wheels and further, they will maintain a precision seat for the lug nut;
4. The inserts of the present invention maintain wheel balance due to the consistent accurate wheel location;
5. The inserts of the invention make the wheel safer by reducing the causes of wheel loosening;
6. The inserts of the invention can even be used with a skirted conical lug nut for precision wheel location if so desired;
7. The inserts of the invention can be used with essentially any standard conical nose lug nut or for that matter, with lug nuts which do not have the standard conical 60 degree nose, although in all cases, the insert must conform to the configuration of the seating portion of the lug nut;
8. The inserts of the invention enable the torque on the lug nut to transmit a greater and consistent clamping force with respect to the wheel;
9. The insert of the present invention is highly effective in that the more it is used the better it performs due to the work hardening effect on the steel of the insert;
10. The insert of the stud cannot knock the insert of the invention out of the stud-receiving opening no matter how hard a wheel may be thrown onto the studs when mounting the wheel on the vehicle.
11. The insert of the invention is highly effective for use on multi-pattern wheels since it is extremely light in weight and since the insert allows the use of a dense hole pattern without weakening the wheel;
12. The insert of the present invention requires no heat treated lug nuts and which precludes any galling or scaring of the lug nut by either the wheel or the insert.

This invention possesses many other advantages and has other purposes which may be made more clearly apparent from a consideration of the forms in which it may be embodied. Several of the preferred forms of the invention are more fully described in the following detailed description of the invention, and are more fully illustrated in the accompanying drawings. However, it is to be understood that this detailed description and the accompanying drawings are not to be taken in a limiting sense, and are only illustrative of preferred embodiments of the invention.

BRIEF DESCRIPTION OF THE DRAWINGS

Figure 16:
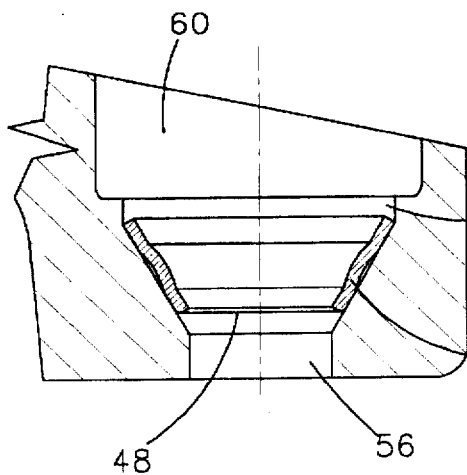
Figure 17:
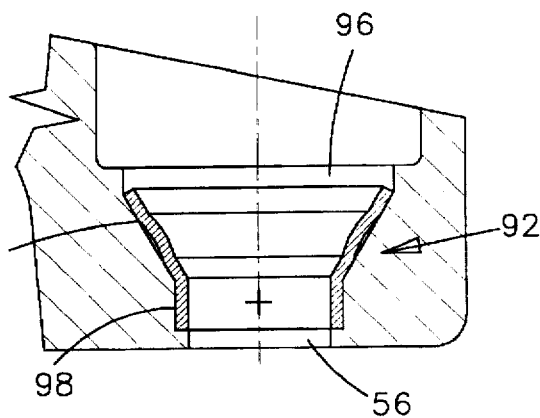
Figure 18:
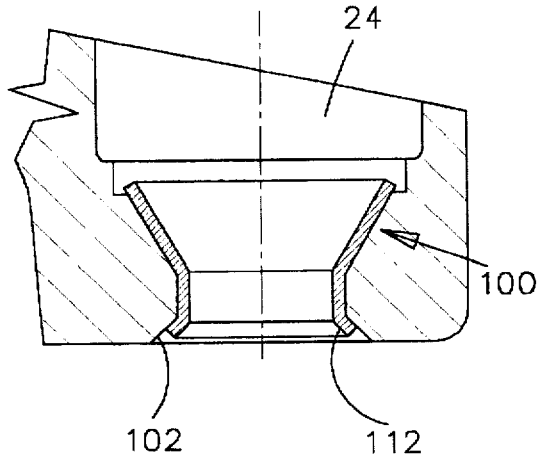
Figure 19:
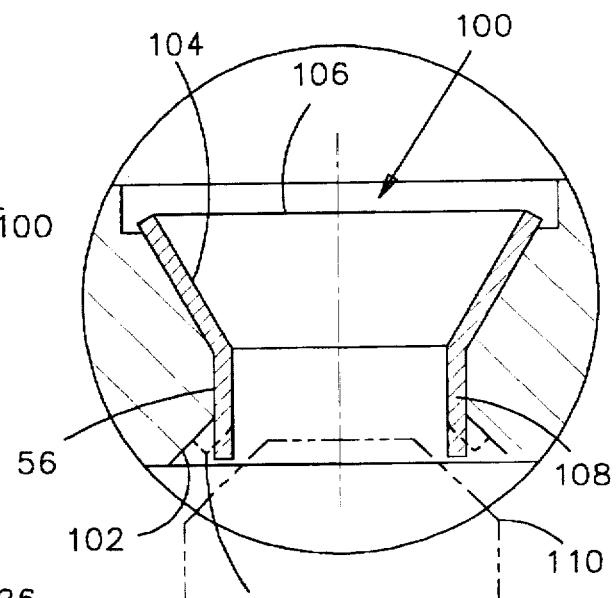
Figure 20:
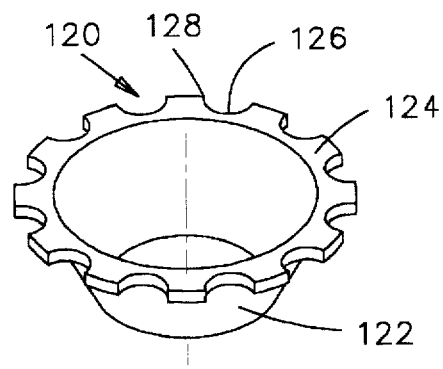
Figure 21:
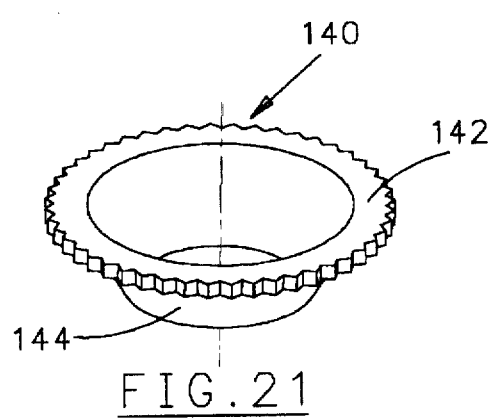
Figure 22:
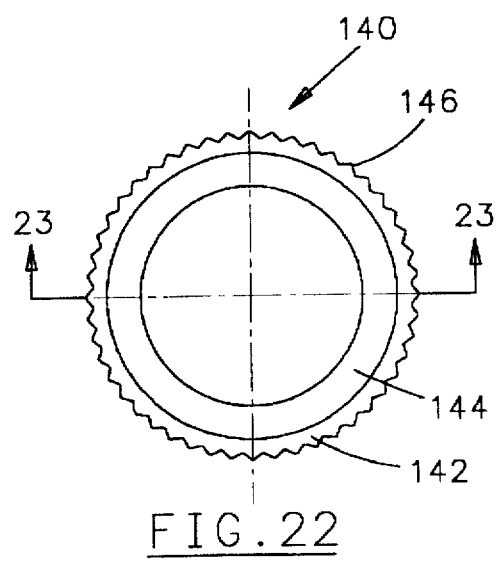
Figure 23:
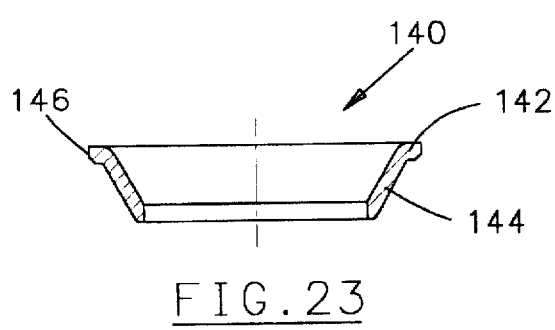
Figure 24:
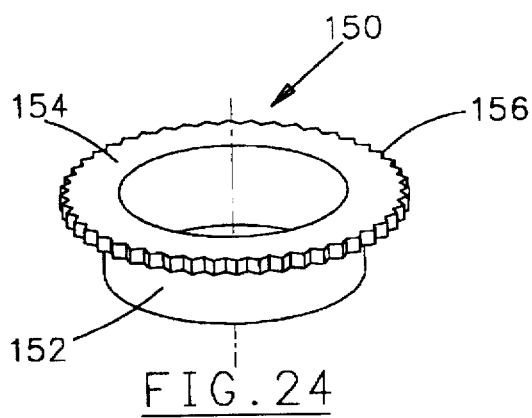
Figure 25A:
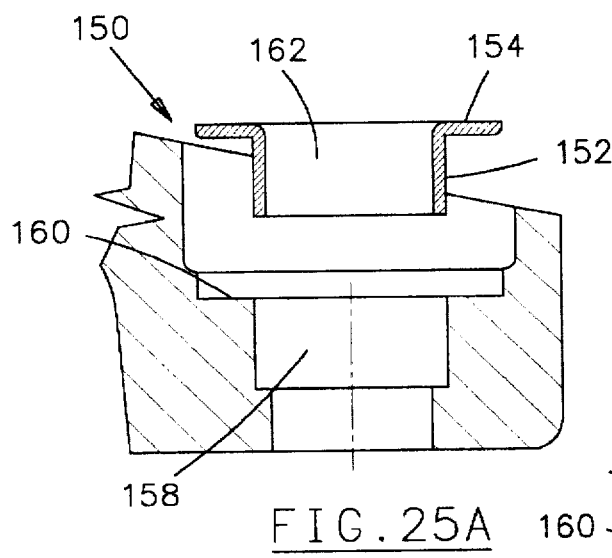
Figure 25B:
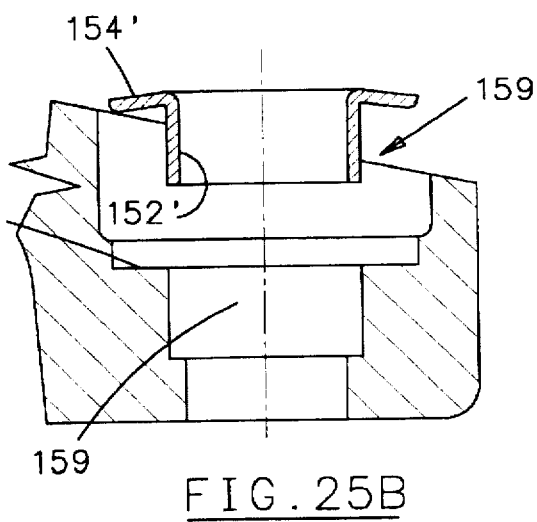
Figure 26:
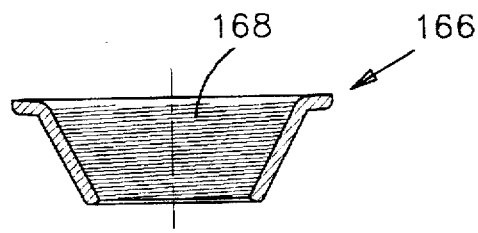
Figure 27:
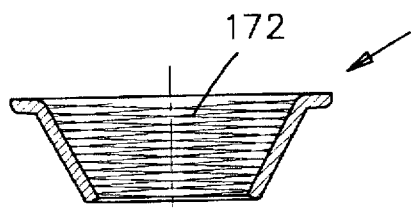
Figure 28:
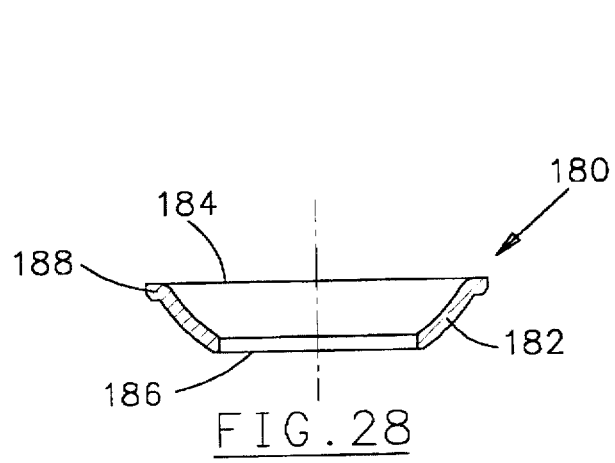
Figure 29:
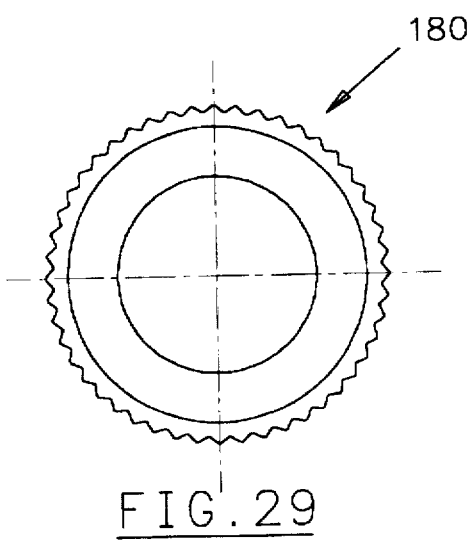
Figure 31:
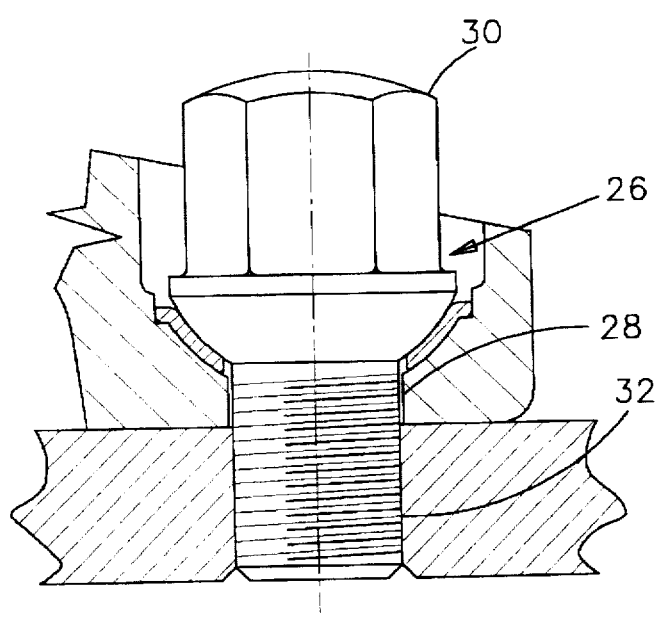
Figure 30:
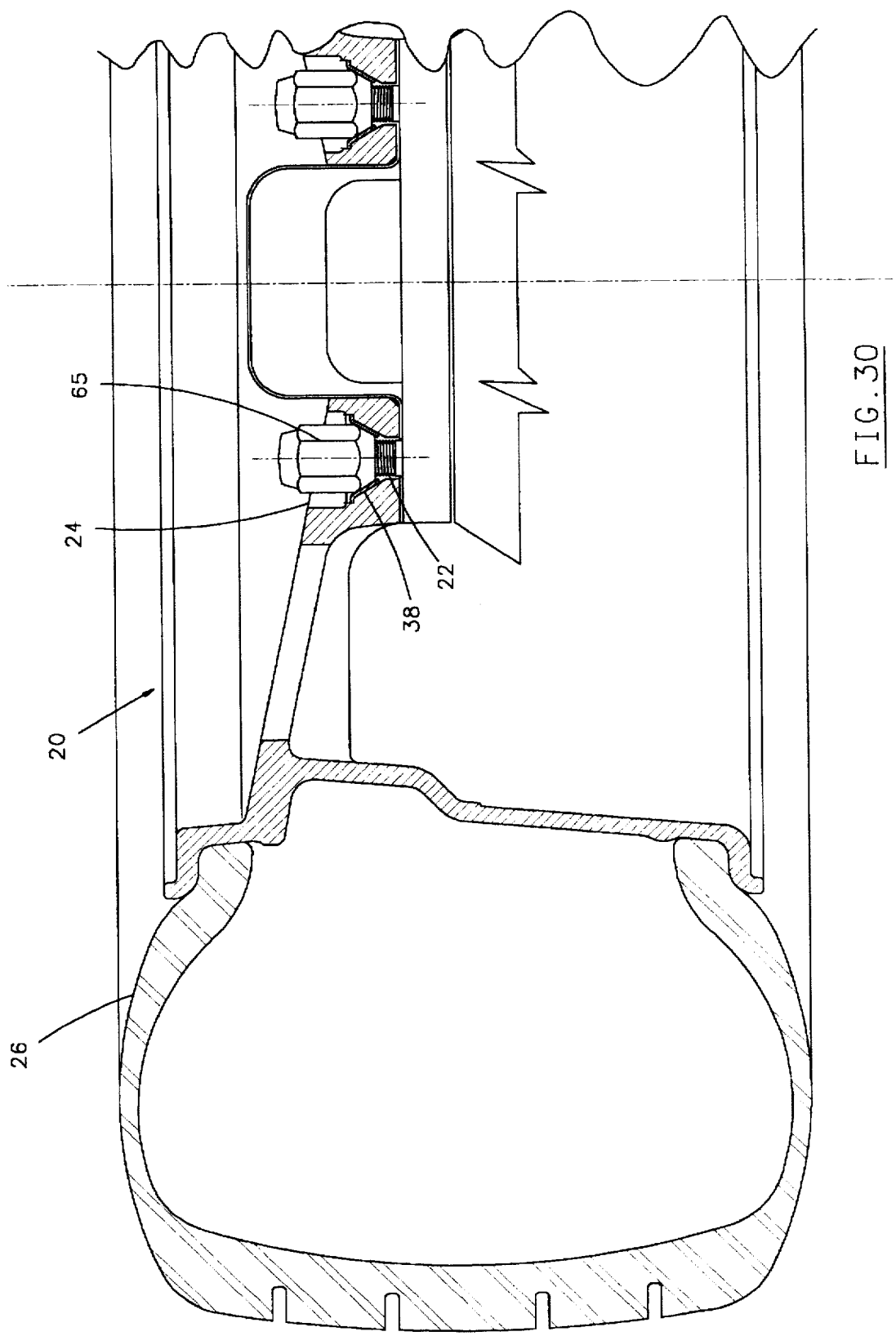

Having thus described the invention in general terms, reference will now be made to the accompanying drawings in which:

FIG. 1 is a perspective view of an insert constructed in accordance with and embodying the present invention;

FIG. 2 is a perspective view of a modified form of insert in accordance with and embodying the present invention;

FIG. 3 is an exploded view, partially in section, and showing an insert arrangement for disposition in the stud-receiving opening of a vehicle wheel;

FIG. 4A is a vertical sectional view showing the fitting of an insert of the type used in FIG. 1 in the stud-receiving opening of a vehicle wheel before securement of a lug nut on a stud projecting through the insert;

FIG. 4B is a vertical sectional view similar to FIG. 4A and showing the fitting of an insert in a stud-receiving opening of a vehicle wheel and in which the insert has an angle of taper greater than the stud-receiving opening;

FIG. 5 is a vertical sectional view showing a deflection of the insert caused by the securement of a lug nut onto a vehicle wheel stud;

FIG. 6A is a vertical sectional view showing the size relationship of an insert having an annular locking flange with respect to a stud-receiving opening for the embodiment of the insert of FIG. 1;

FIG. 6B is a sectional view, somewhat similar to FIG. 6A, and showing the size relationship of the insert of FIG. 2 without any annular flange with respect to a stud-receiving opening of a vehicle wheel;

FIG. 6C is a vertical sectional view and showing the locating and locking of a further modified form of insert in a stud-receiving opening;

FIG. 7 is a vertical sectional view showing a securement of an insert into a stud-receiving opening by the effect of interference;

FIG. 8 is an enlarged sectional view, somewhat similar to FIG. 7, and more fully showing the interference effect of locking the insert in a stud-receiving opening of a vehicle wheel;

FIG. 9A is an elevational view showing the locking of still a further modified form of insert in accordance with the present invention;

FIG. 9B is an elevational view, similar to FIG. 9A, and showing the locking of an insert which has a slightly convex upper face and a slightly concave lower face;

FIG. 10 is a perspective view of yet another modified form of insert constructed in accordance with and embodying the present invention and used in achieving an interference locking action in a stud-receiving opening;

FIG. 11 is a vertical sectional view showing the locking of another modified form of insert in a stud-receiving opening by interference effects;

FIG. 12 is a vertical sectional view showing the interference effects achieved through the locking of still a further modified form of insert constructed in accordance with the present invention;

FIG. 13 is a vertical sectional view, somewhat similar to FIG. 8 and showing the securement of an insert in a stud-receiving opening of a vehicle wheel by the effect of staking;

FIG. 14 is a fragmentary enlarged vertical sectional view more fully illustrating the effects of staking an insert into a stud-receiving opening and the means to achieve the staking operation;

FIG. 15 is a side elevational view, partially in section and showing the wedging of an insert in a stud-receiving opening by the clamping effect of a lug nut;

FIG. 16 is a vertical sectional view showing the Belleville spring effect created by an insert disposed in a stud-receiving opening;

FIG. 17 is a vertical sectional view showing an insert press-fitted into a stud-receiving opening;

FIG. 18 is a vertical sectional view showing an insert having a swage fitted securement within a stud-receiving opening of a vehicle wheel, FIG. 19 is a vertical sectional view, somewhat similar to FIG. 18, and showing in phantom lines, one means of achieving the swaging of the insert in the stud-receiving opening of a vehicle wheel;

FIG. 20 is a perspective view of another slightly modified form of insert constructed in accordance with and embodying the present invention;

FIG. 21 is a perspective view of a further modified form of insert constructed in accordance with and embodying the present invention;

FIG. 22 is a top plan view of the insert of FIG. 21;

FIG. 23 is a vertical sectional view of the insert of FIGS. 21 and 22 taken substantially along line 23—23 of FIG. 22;

FIG. 24 is a perspective view of still a further modified form of insert constructed in accordance with and embodying the present invention and which has a cylindrically shaped head as opposed to a conically shaped head;

FIG. 25A is an exploded schematic side elevational view showing the fitting of an insert of FIG. 24 into a stud-receiving opening of a vehicle wheel;

FIG. 25B is an exploded schematic side elevational view, somewhat similar to FIG. 25A and showing the fitting of another modified form of insert into a stud-receiving opening of a vehicle wheel;

FIG. 26 is a vertical sectional view of still another modified form of insert constructed in accordance with and embodying the present invention;

FIG. 27 is a vertical sectional view of yet another modified form of insert constructed in accordance with and embodying the present invention;

FIG. 28 is a vertical sectional view, somewhat similar to FIG. 23, and showing yet another modified form of insert constructed in accordance with and embodying the present invention;

FIG. 29 is a top plan view of the insert of FIG. 28;

FIG. 30 is a side elevational view, partially in section, and showing the mounting of a vehicle wheel on the studs projecting from a vehicle wheel hub using the inserts of the present invention; and FIG. 31 is a side elevational view, partially in section, and similar to FIG. 30, and showing the mounting of the vehicle wheel using locking bolts along with the inserts of the present invention.

DETAILED DESCRIPTION OF PREFERRED EMBODIMENTS

Referring now in more detail and by reference characters to the drawings which illustrate several practical embodiments of the invention, FIG. 30 more fully illustrates a mounting of a vehicle wheel, such as an aluminum wheel 20, to the threaded studs 22 mounted on and projecting outwardly from the wheel hub of the vehicle. In this case, it can be observed that the vehicle wheel, which is in the form of an aluminum wheel, is provided with a plurality of openings (usually four to eight openings) 24 which axially receive the externally threaded studs 22.

The vehicle wheel 20 is conventional in construction and is therefore not described in any further detail herein. However, as shown in FIG. 30, the wheel is conventionally provided with a tire 26.

FIG. 31 illustrates a slightly modified form of mounting a vehicle wheel, such as the aluminum wheel 20, to a vehicle hub. However, bolts 26 having a threaded bolt shank 28 and a head 30 are used for securing the vehicle wheel. In this case, it can be observed that the bolt shank 28 extends into an internally threaded aperture 32 formed in the vehicle wheel hub. This type of mounting arrangement is common in many types of vehicles and particularly those manufactured by non-U.S. automobile manufacturers.

In either of the embodiments as shown in FIGS. 30 and 31, however, it can be observed that the stud projecting from the wheel hub is the equivalent of a bolt. Consequently, and since both are threaded, they are referred to herein as the threaded studs. Furthermore, in the embodiment of the invention as shown in FIG. 31, it can be seen that the bolt head 30 fits within the opening 34 which defines a conically shaped seat section 34. It should also be understood that the lug nuts themselves could be used in the spherical shaped seating portion. This also shows the possibility of using the inserts of the present invention in conically shaped seats of a stud-receiving opening or a spherical shaped seats in a stud-receiving opening. The only difference is that the insert is slightly modified in order to conform to the shape of the particular seating section. In either case, the bolt head or lug nut must serve the same purpose and are generally referred to herein as a "head".

In accordance with the present invention, an insert 38 is schematically illustrated in FIG. 30 as being fixed within the stud-receiving opening 24. Moreover, as stated above, it can be observed that the stud-receiving opening 24 is conically shaped, or at least has a conically shaped portion, and the insert 38 itself is conically shaped to seat within the conically shaped portion of the stud-receiving opening 24. A lug nut 65 is provided for securement to the externally threaded stud 22 to thereby rigidly hold the wheel 20 onto the studs 22 of the vehicle.

Referring to FIG. 1, one of the inserts 38 is more fully illustrated and comprises a hollow body 44 with an opened upper end 46 and an opened lower end 48. The opened upper end 46 and the lower end 48 are sized sufficiently so as to allow a stud of a vehicle hub to extend therethrough. The frusto-conically shaped body 44 has an exterior frusto-conically shaped exterior side wall 50 and an interior frusto-conically shaped side wall 52. The exterior side wall 50 of the insert 38 will bear against a frusto-conically shaped side wall section 54 of the stud-receiving opening 24, as best shown in FIG. 3.

Referring now in more detail to FIG. 3, it can be seen that the stud-receiving opening 24 initially has a cylindrically shaped stud-receiving section 56 which merges into the frusto-conical side wall section 54. Furthermore, the frusto-conical side wall section 54 has a diametrically enlarged shoulder forming recess 58, the lower flat wall of which functions as a shoulder, as illustrated. This shoulder-forming recess 58, in turn, merges into a cylindrically shaped nut-receiving section 60, the latter of which is designed to receive a conventional lug nut, such as the lug nut 62 illustrated in FIG. 5.

Turning again to FIG. 3 and also to FIG. 4A, it can be observed that the insert 38 will fit within the stud-receiving opening 24 and the frusto-conically shaped body 44 will fit within the frusto-conically shaped section 54 of the stud-receiving opening 24, in the manner as illustrated. In this case, the insert 38 is securely retained in the opening 24 in a manner to be hereinafter described in more detail.

In the embodiment of the insert 38, as illustrated in FIG. 1, the body 44 integrally merges into an outwardly extending annular ring flange 64. When mounted in the stud-receiving opening 24 the annular ring flange 64 will sit within the enlarged shoulder-forming recess 58, as illustrated in FIGS. 4 and 5 of the drawings.

FIG. 2 illustrates a slightly modified form of insert 38'. This modified form of insert 38' is substantially identical to the insert 38, except for the fact that it does not have a ring flange 64 surrounding the upper open end 46.

Although not critical in the present invention, there may be a differential angle between the angle of taper of the conically shaped wall of the insert and the conically shaped wall of the stud-receiving opening. This facilitates the allowance of a Belleville-type spring effect, as hereinafter described in more detail. However, it is not absolutely necessary to provide this differential angle of taper, although it can be preferred in many embodiments.

Referring again to FIGS. 4 and 5, it can be observed that the frusto-conically shaped body 44 of the insert preferably has an angle of taper which is slightly less then that of the conically-shaped side wall section 54 of the stud-receiving opening 24. Thus, in FIG. 4, it can be observed that the exterior frusto-conically shaped side wall surface 50 of the insert has an angle of taper a-2 and the interior conically-shaped side wall section 54 of the opening 24 has an angle of taper a-1 with respect to an axial centerline passing axially through the insert, thereby providing a differential angle 68. The angle a-2 is normally slightly smaller than the angle a-1. Thus, it can be observed that there may actually be some clearance between the upper end of the frusto-conically shaped body 44 and that of the frusto-conically shaped section 54 of the stud-receiving opening 24. The lug nut 62 is provided with a tool-receiving side wall 63 and a somewhat tapered upper end 65, as well as a conically shaped, tapered skirt 69. In this respect, the lug nut 62 is of a generally conventional construction. However, it can be observed that the tool-engaging surface 63 has a lower end 66 which engages and bears against the interior conically shaped side wall surface 52 of the body 44 of the insert 38. Thus, when the lug nut 62 is tightened on the threaded stud 22, it will create a compressive force on the lug nut 62 forcing the lower end 66 into the side wall 54 of the body 44. As this occurs, the body 44 will deflect somewhat as shown in FIG. 5, thereby causing the body 44 to become rigidly secured within the stud-receiving opening 24.

FIG. 4B illustrates the effect of insert, such as the insert 38, which has an included angle which is effectively greater than the angle of the seat 34 in the stud-receiving opening 24. In the embodiment of the invention as shown in FIG. 4A, the insert had an angle of taper from its upper end to its lower end which was approximately 10 degrees less than the angle of taper of the seat. However, the insert in FIG. 4B has an angle of taper is proximately 10 degrees greater than the angle of taper of the seat.

In either case, the locking effect which is achieved by the insert is effectively the same. It can be observed, however, that in the case of the insert in FIG. 4A, there is initially a slight gap between the wall of the insert and the seat at the upper portion. However, in the insert arrangement in FIG. 4B, there is a slight gap between the lower end of the insert and the wall of the seat. In either case, however, when the lug nut is tightened against that insert, the insert will effectively crunch against the wall of the stud-receiving opening, and thereby effectively form a tight locking action in that stud-receiving opening.

The differential of the angle between the seat in the stud-receiving opening and the insert can range from about −10° to about +10°. Thus, the seat may have an angle of taper which is up to about 10° greater than the wall of the insert to about 10° less than the wall of the insert.

The lodging of this insert 38 in the stud-receiving opening, and particularly where there is a differential angle between the conically shaped wall of the insert and the conically shaped wall of the stud-receiving opening, has the unique effect of creating a Belleville spring-type action. Because of the steel insert 38 itself has some resiliency, there is a tendency of the insert 38 to react against the action of the lug nut 62. This, in effect, creates a force against the lower edge 66 of the lug nut 62 which would cause the lug nut 62 to shift axially along the stud 22. However, due to the fact that lug nut 62 is tightened on the externally threaded section of the stud 22, the threads of the nut and the stud interfere and thereby lock against one another. Due to the fact that the lug nut 62 is also under a type of compressive force, as a result of its being threadedly secured on the stud and being forced by the Belleville spring action of the insert 42, the lug nut is precluded from unauthorizedly unwinding from the stud.

FIGS. 6A and 6B show the size relationship of the insert 38 and the modified form of insert 38' with respect to the stud-receiving openings. In this case, and by reference to FIG. 6A, it can be seen that the lower opened end 48 of the insert 38, and particularly the side wall 44 at its lower opened end, has a size which is generally equal to the overall diametrical size of the stud-receiving opening. In fact, the diametrical size is absolutely no less than that of the stud-receiving opening and should be even greater than the lower most end of the stud-receiving opening so that a stud has no possibility of engaging the insert. The flange 64 on the insert is, again, approximately equal to the diametrical size of the shoulder area 58 merging into the frusto-conically shaped section 54 of the stud-receiving opening. Here again, the flange 64 can have a slightly greater dimension in order to create a tight interference effect in the shoulder-forming recess 58. In this way, the flange will tightly engage the annular wall of the recess 58, as hereinafter described in more detail.

Specifically, and by further reference to FIG. 6A, it can be observed that the lower end of the insert has a size X-1 which is approximately slightly greater than the diameter of the cylindrical section X-2. In this way, a stud initially projecting through the stud-receiving opening will not engage the lower end of the insert and force the same outwardly from the stud-receiving opening. The upper end of the insert, including the ring flange 64, has a dimension X-3, which is approximately equal to the diameter of the shoulder-forming recess 58. The diameter of the shoulder is identified by the dimension X-4 in FIG. 6A. The flange 64 may actually have a slightly greater diametrical size than the shoulder-forming recess 58 in order to create a tight interference effect. However, the flange size can be slightly less than the shoulder-forming recess 58 when other types of locking, such as staking, is to be employed, as hereinafter described.

The size differential between the components of the insert and the stud-receiving opening is not significantly large and is generally measured in mils. The relationships of the sizes of the insert components to that of the stud-receiving opening are also more fully described hereinafter in connection with the locking of the inserts in the stud-receiving opening.

The overall size relationship of the modified form of insert 38', as shown in FIG. 6B, is essentially the same with the recognition that the modified insert 38' does not contain the ring flange 64. However, and in this case, the modified insert 38' will fit within the frusto-conically shaped portion 54 of the stud-receiving opening 24.

It can be seen by further reference to FIGS. 6A that the overall cross sectional thickness of the insert 38 is constant throughout its length and specifically throughout the entire cross sectional portion of the body 44. The same holds true in connection with the insert 38', as illustrated in FIG. 6B of the drawings. Indeed, this is also more specifically shown in FIGS. 1–5 of the drawings whereas the cross sectional thickness of the entire body of the insert is constant. The same holds true of the ring flange 64.

Generally, in prior art inserts, the thickness of the insert is clearly not constant throughout. Typically, the body of the insert, as for example, the insert of FIG. 6C has a body section 54' which has a greater thickness progressively from the lower end to the upper end thereof. In addition, this body has a depending skirt 55' which may of relatively constant thickness throughout. However, it can be seen that the body 54' is tapered such that the lug nut seating surface 56' has an angle of about 60 degrees and the outer conically shaped surface 57' which fits within the seat of the stud-receiving opening has an angle of about 90 degrees. By definition, the cross sectional thickness increases from the skirt 55' to the upper edge of the body 54'.

When compared to the inserts of the present invention, these inserts of the invention all have the same contour both on their interior surface and their exterior surface as does that of the stud-receiving opening. Moreover, the 60 degree inner seating surface of the inserts of the present invention precisely conform to the contours of most conventional lug nuts. It can be observed that in connection with the prior art inserts, the flange was never used to retain the insert in the stud-receiving opening. Indeed, if a flange existed on any of the prior art inserts, clearance was always provided so that the flange would not effect or impede the press-fitting of the knurled surface into the stud-receiving opening.

When a knurled skirt of a prior art insert was pressed into a stud-receiving opening and used to retain the insert in that opening with an interference fit, the insert typically did not have the same axial centerline as the stud-receiving opening into which it was pressed. Indeed, it has been found that the greater the interference fit resulted in the greater error in concentricity. One of the other problems with the interference fit on the skirt was the fact that the skirt would typically be forced to one side of the stud-receiving opening scraping the material on that side of the opening causing a so-called "snow-plowing" effect. This caused the insert to be off-center relative to the stud-receiving opening. Indeed, it has been found that stress cracks, inaccurate wheel location, wheel imbalance and overstressing of the mounting studs resulted in wheels using inserts which were overpressed and lacked concentricity in the stud-receiving opening.

FIG. 7 illustrates the retention of an insert, such as the insert 38 in the stud-receiving opening by means of an interference action. In this case, it can be observed that the edge of the ring flange 64 fits tightly within the shoulder-forming recess 58 and bears against the shoulder therein. The insert 38 is forced into the conically shaped portion 54 of the stud-receiving opening 24 until the ring flange 64 sits firmly within the seat formed by the shoulder-forming recess 58.

In the embodiment of the invention as shown in FIG. 7, it can be seen that the ring flange 64 has an outer end wall which is effectively parallel to an axial centerline passing through the insert and this end wall tightly engages the shoulder-forming wall 58. In this way, there is a tight frictional interference between the outer end of the ring flange 64 and the shoulder-forming wall 58 which is sufficient to tightly retain the insert 38 in the stud-receiving opening. In many cases, the outer end wall of the ring flange 64 may have serrations or the like, as hereinafter described, but this embodiment shows that the ring flange is effective in retaining the insert within the stud-receiving opening by the frictional effect. Consequently, there is no need for a skirt on the insert. Moreover, due to the fact that the body itself will deflect when a lug nut is threaded on the stud, the outer surface of the body will tightly engage the stud-receiving opening and thereby provide a further locking action.

FIG. 8 is an enlarged fragmentary vertical sectional view showing the details of the interference effect. In this case, it can be seen that an upper annular edge 67 of the ring flange 64 physically engages and is actually forced into the wall of the shoulder forming region 58. The upper edge, if desired, could be formed with a slightly greater overall diameter than the remaining portion of the ring flange 64. However, if the ring flange 64 is sized to tightly fit within the shoulder forming recess 58, then any force which tends to push the insert out of the stud-receiving opening will cause this upper edge to engage the softer aluminum metal and effectively bit into the metal to become thereby permanently lodged in the stud-receiving opening.

The narrow ring flange 64 as well as the narrow circular ring flanges on most of the other embodiments of the present invention, have a spring-back and which allows the biting of the upper edge into the soft aluminum of the wheel without overstressing the insert cavity. In contrast, conventional inserts sometimes cause cracks in the metal of the wheel when the press-fitting is too great. In this case, the insert has a locking flange which is the last portion of the insert to enter the stud-receiving opening, that is, after the conically shaped body, or nose, aligns the insert. This prevents an offset or so-called "cockeyed" installation. The sharp biting edge of the ring flange effectively operates as a one-way retaining washer which permits the insert to easily be inserted in the stud-receiving opening but thereafter effectively locks the insert in place.

In essence, and in substantially all of the embodiments of the invention, the ring flange, or for that matter, the upper end of the body, has an outer angular edge which allows for the biting into the soft aluminum wheel. It is effectively this type of action which physically locks the insert in place in the stud-receiving opening and eliminates the need for a skirted insert of the type previously used in the prior art.

Due to the fact that there is a constant wall thickness in the insert, there is no concentricity error. This will accurately maintain the insert in the stud-receiving opening and prevents wheel imbalance and more importantly, it prevents over-stressed studs.

FIG. 9A illustrates another modified form of insert which has a body 44, approaching a generally flat configuration. However, this insert has a much greater angle with respect to an axial center line 45 passing through the stud-receiving opening. FIG. 9A effectively illustrates the fact that the insert need not have a fairly acute angle with respect to the axial center line passing through the stud-receiving opening, as for example, as shown in FIG. 3 where the wall of the insert has an angle of approximately 45° with respect to the axial center line 45. However, in the insert of FIG. 9A, it can be seen that the insert body has an angle of at least 75° or greater with respect to the axial center line 45. Thus, in this case, the insert has a fairly slight convex upper surface and a slightly concave lower surface. Further, in this case, the body 44 actually begins to merge into a type of peripheral ring. Nevertheless, in all cases, the insert will not approach a truly flat washer arrangement. The insert will always have some degree of convexity with respect to the upper surface and some degree of concavity with respect to the lower surface or otherwise some degree of concavity with respect to the upper surface and some degree of convexity with respect to the lower surface.

In the insert body as illustrated in FIG. 9A, the insert body 44 also has an upper outer edge 67', which is capable of effectively biting into the softer wall of the surrounding stud-receiving opening. Nevertheless, the very fact that the lug nut will bear against the insert and cause a deflection thereof within the stud-receiving opening will cause a locking action.

FIG. 9B illustrates an embodiment of the invention in which the insert has a slightly convex upper surface and a slightly concave lower surface. Thus, and in this case, the insert has a body 44 with an upper surface having an angle of taper which is obtuse with respect to the axial center-line 45 and a lower surface which is acute with respect to the axial center-line 45. As indicated previously, this insert will also effectively operate in accordance with the present invention.

The angle of the insert body with respect to the axial center line passing through the stud-receiving opening, such as the axial center line 45, can range from about 60° to about 168°, and more preferably from about 60° to 150°. In some cases, the angle could be less than 60° as for example, with proper tolerances it could be 58°. However, in most passenger automotive vehicles, the angle is about 60° and with most trucks, the angle is about 90°.

FIG. 11 illustrates still a further modified form of insert 72 which may be used in connection with the present invention. In this case, the insert 72 is similar to the previously described insert 38, except that the insert 72 is provided with a somewhat rounded annular wall 74 on its ring flange 76. The flange 76 also terminates in a sharp upper annular edge 78 which is adapted to again bite into and tightly engage the softer metal of the stud-receiving opening, as best illustrated in FIG. 11 of the drawings.

FIG. 12 illustrates a slightly modified form of insert 80 similar to the previously described insert 38' of FIG. 2. However, in this case, the insert 80 is provided with a slightly beveled upper annular wall 82 terminating in a sharp annular outer edge 84. Thus, by further reference to FIG. 12, it can be seen that the upper annular wall 82 converges downwardly and outwardly into the annular conically shaped side wall of the insert. As illustrated in FIG. 12, the upper edge is beveled as shown, that is, it converges downwardly and outwardly. However, the upper edge could be flat, much in the same manner as in connection with the insert 38'. Further, any angle of bevel could be employed in connection with the inserts of the invention. Nevertheless, in all cases, the edge 84 if effective in that this edge 84 is capable of biting into and retentively holding the insert 80 within the wall of the stud-receiving opening.

FIGS. 13 and 14 illustrate the locking of an insert, such as the insert 38, in the conically shaped portion 54 of the stud-receiving opening 24 by means of a staking action. In this case, it can be seen, by reference to FIG. 14, that the ring flange 64 actually fits within the shoulder-forming recess 58. The insert 38 is locked into the stud-receiving opening through a deformation of a wall of the stud-receiving opening and particularly, a portion of the wall forming the cylindrically shaped nut-receiving section 60, so as to form an annular stake 86 which extends around and sits upon the upper surface of the ring flange 64, again as best illustrated in FIGS. 13 and 14 of the drawings.

A tool, or other metal implement, 88, having a relatively flat bottom wall 90, (shown in dotted lines in FIG. 13) is placed upon and engages just the surface of the nut-receiving section 60 as it merges into the shoulder-forming recess 58. This metal implement or tool 88 is then struck with sufficient force so as to deform the portion of the stud-receiving opening to form the annular projection 86, or so-called "stake." In this way, it can be seen that the insert 38 is retentively held within the stud-receiving opening.

It should be understood in connection with the present invention that it is not necessary to create an annular stake around the upper edge of the insert. Staking can occur at various points surrounding the upper annular edge of the insert or, for that matter, the flange 64 on the insert, if one is employed. Thus, the user could strike the softer aluminum metal with a blunt small instrument to create a plurality, e.g., three points around the insert to form three individual stakes.

FIG. 17 illustrates a modified form of insert 92 which has a frusto-conically shaped body 94 and an opened upper end 96. The body 94, in this particular embodiment, is also integrally provided with a cylindrically shaped depending skirt 98, as best shown in FIG. 17. The skirt 98 has a size approximately equal to the stud-receiving opening 56. However, the outer diameter of the skirt 98 is sized so as to very snugly fit within the opening. The insert 92 is thus press-fitted into the stud-receiving opening.

It can be seen that the insert 92 has both the conically shaped section fitted within the conically shaped portion 58 of the stud-receiving opening, and the cylindrically shaped section fitted within the cylindrically shaped stem-receiving section 66 of the stud-receiving opening. In this particular embodiment, as shown in FIG. 17, even though a skirt is employed, this embodiment nevertheless shows the fact that the actual deflection of the conically shaped section will retentively hold the insert within the stud receiving opening. Also, in this particular embodiment, the use of the skirt is not necessary to achieve the locking action in accordance with the present invention.

The insert 92 is somewhat similar to the prior art inserts which also use the skirt and thus, it is much more costly to produce and also has the increased weight when compared to the other inserts illustrated and described herein. In addition, the insert 92 also must have a close tolerance with respect to the stud-receiving opening and particularly, the conically shaped sidewall section and the cylindrically shaped stud-receiving section 56 of the stud-receiving opening. From this standpoint, the insert 92 is not necessarily preferred, although it will effectively operate with the Belleville spring action heretofore described and also, hereinafter described in more detail.

FIGS. 18 and 19 illustrate a modified form of insert 100 which is swaged into the stud-receiving opening 24 in the manner as shown. The stud-receiving opening 24 has a slightly diametrically enlarged lower end 102 which integrally merges into the stem-receiving section 46 of the stud-receiving opening. In many cases, the wheel is constructed so that the stem-receiving section 46 has a diametrically enlarged end, such as the end 102, as shown in FIG. 18. By reference to FIG. 19, it can be seen that the insert 100 is provided with a conically shaped wall section 104 equivalent to the body 34 and which opens into an upper end 106. The lower end of the conically shaped section 104 integrally merges into a cylindrically shaped skirt 108, as best shown in FIG. 19. The skirt 108 projects beyond the stem-receiving section 56 and into the region of the outwardly flared enlarged lower end 102.

The insert 100 is actually wedged into the stud-receiving opening by forcing the skirt 108 outwardly by means of a conically shaped tool 110, as also best illustrated in FIG. 19. By striking the tool 110, it can be seen that the lower end of the skirt 108 will be flared outwardly in the form of a wedge 112. In this way, the insert 100 will be retentively and permanently locked in the stud-receiving opening of the vehicle wheel.

Each of the above-described embodiments of the insert provide an effective means for securing the insert within the stud-receiving opening of a vehicle wheel. In many cases, the insert can be retained merely by forcing the side wall of the insert into and tightly against the conically shaped portion of the stud-receiving opening. In other cases, securement of the insert is achieved by the other means, as disclosed herein, as for example, interference, staking, or the like.

FIGS. 15 and 16 and to some extent FIG. 17, more fully illustrate the Belleville spring-type action which results from the use of the inserts of the present invention. By reference to FIG. 15, it can be observed that the lower edge 66 of the tool receiving side wall 63 of the lug nut bears against the interior surface of the frusto-conically shaped side wall of the insert. In addition, the tapered skirt of the lug nut also bears against the side wall 44 of the insert 38. This effectively clamps the insert in the stud-receiving opening. Due to the fact that the insert itself has an angle of taper which is actually slightly greater than the angle of taper of the conically shaped seat of the stud-receiving opening, as shown in FIG. 13, for example, there is a tendency for the side wall of the stud-receiving opening to deflect outwardly. This will create a compressive force causing the side wall to buckle inward slightly, as shown in FIG. 16 of the drawings.

A similar action of the deflecting side wall of the body of the insert can also occur with the inserts as shown in FIG. 8, for example. Even though the body of the insert may have a lesser angle with respect to axial center line passing through the stud-receiving opening, than does the conically shaped portion of the stud-receiving opening, the insert body can nevertheless deflect and create a compressive force causing the clamping action, as aforesaid.

When the lug nut is forced against the interior surface of the frusto-conically shaped body of the insert, there is a spring-type action which is effectuated. This spring-type action operates against the action of the lug nut. In effect, the lug nut is partially captured on the stud from the wheel by virtue of the fact that it is threadedly mounted thereon. Thus, the lug nut is effectively clamped onto the stud of the wheel.

It can be seen by further reference to FIGS. 15 and 16 that by the use of the simple insert and lug nut arrangement, as described herein, there has been achieved a torsion ring with a Belleville spring effect, much in the same manner as that which is achieved with a steel lug nut on a steel wheel. The same action will occur with respect to many of the other insert embodiments as described herein. Thus, by use of the arrangement in the present invention, it is now possible to secure an aluminum wheel, or other soft metal wheel, to the hub of a vehicle with the same degree of accuracy and with the same adherence as that achieved with a steel wheel.

Also in accordance with the present invention, it can be seen that there are several means of physically and retentively locking an insert within the stud-receiving opening of a vehicle wheel. Moreover, these various means enable the physical locking of an insert in the stud-receiving opening, without the need of precision ground knurling on a cylindrically shaped skirt section of the insert. Furthermore, the insert is effectively locked, even though formed of a relatively thin-walled sheet metal.

FIG. 20 illustrates another slightly modified form of insert 120 which is similar to the previously described insert 32 in that the insert 120 has a frusto-conically shaped side wall 122 and an upper annular ring flange 124. In this case, the ring flange 124 is provided with a series of angularly extending radially inwardly projecting recesses 126. This provides for relatively sharp edges 128 at each of the opposite ends of the recesses 126, as best shown in FIG. 20. These edges 128 are effective in biting into the soft aluminum and thereby preclude rotation of the insert and any potential loosening effect when the lug nut is tightened on this stud projecting into the stud-receiving opening.

It should also be understood that other forms of an irregular edge on the flange 124 could be used. For example, the flange 124 could be provided with a serrated annular edge, or the like. FIG. 10, for example, illustrates an insert 130 which is similar to the previously described insert 38, as shown in FIG. 1, and includes a frusto-conically shaped side wall 132 integrally merging into an annular ring flange 134, as shown. In this embodiment, the ring flange 134 is provided with a plurality of circumferentially spaced apart outwardly projecting tangs 136, as best shown in FIG. 10. In accordance with this construction, the tangs 136 will effectively bite into a soft aluminum stud-receiving opening wall and also preclude rotation of the insert and thereby avoid any potential loosening effect when a lug nut is tightened on a stud projecting into the stud-receiving opening. Furthermore, the tangs 136 also provide an effective means of seating and retentively holding the insert within the stud-receiving opening against any axial displacement force.

FIGS. 21 through 23 illustrate a modified form of insert 140 which includes an annular flange 142 on a conically shaped body 144. In this respect, the conically shaped body 144 is similar to the body 44 of the insert 38. The annular flange 142 includes serrations such as teeth 146 along the entire annular surface thereof. This type of insert has been found to be highly effective in creating the desired biting action to effectively bite into the soft aluminum metal and thereby lock the insert in place.

FIG. 24 illustrates another slightly modified form of insert 150 also constructed in accordance with and embodying the present invention. In this particular case, the insert 150 has a cylindrically shaped body 152, as opposed to the frusto-conically shaped body 144 on the insert 140. This type of insert is effective for use in those wheels which have cylindrically shaped seating sections as opposed to the more common conically shaped seating section. Nevertheless, many vehicle wheels, and particularly some of the non-U.S. manufactured vehicles wheels, do use the cylindrically shaped seating section. It is to be noted that the cylindrically shaped body 152 is actually the head, or that portion of the insert which aids in the seating, and is not a skirt as such. Thus, and in this respect, the body 152 has only a relatively short vertical dimension such that it would not function as a skirt, to provide a seating action as in the prior art.

The insert 150 as shown in FIG. 24 also includes an annular ring flange 154. In this particular embodiment, the ring flange 154 includes a serrated edge 156 similar to the serrated edge 156 on the insert 140. However, it should be understood that other protrusions on the ring flange 154 could be provided. Furthermore, the ring flange 154 could have a relatively flat outer annular end wall such that it provides a frictional fit within the shoulder-forming section of the stud-receiving opening.

FIG. 25A is an exploded somewhat schematic side elevational view showing the manner in which the insert 150 would be fitted within a stud-receiving opening 158 and which has a cylindrically shaped shoulder-forming section 160. In this embodiment, it is to be noted that the body 152 of the insert 150, if desired, may extend for only a short distance within the stud-receiving opening 158. The locking action in this case would be provided by the ring flange 154 fitting tightly within the shoulder-forming section 160.

FIG. 25B is an exploded somewhat schematic side elevational view which is similar to FIG. 25A, and showing the locking of an insert 159 within the stud-receiving opening 158. In this case, however, the insert 159 has a ring flange 154' which has a slightly acute angle with respect to a skirt of the insert 152'. The insert will nevertheless effectively fit within and will also lock within the stud-receiving opening in the same manner as the insert shown in FIG. 25A.

The insert arrangement as shown in FIGS. 24 and 25A and 25B is also highly effective where a bolt is to be used as the stud for locking a vehicle wheel on the wheel hub. In this case, the bolt head (not shown) would fit against the upper surface of the ring flange 154 and the shank of the bolt would extend through a central bore 162 of the insert.

FIG. 26 illustrates another modified form of insert 166 which is constructed in accordance with and embodying the present invention. The insert 166 is essentially identical to the previously described insert 38 except that the insert 166 includes a helically shaped threaded section 168 on the interior of the body thereof. This threaded section 168 is effectively a helical ridge which extends around the body section from the upper to the lower end thereof. In accordance with this construction, when a lug nut is tightened against the insert on a threaded stud, the lug nut will also effectively become locked into the threaded section 168. Further, it is to be noted that the threaded section 168 has turns which are opposite to the direction of rotation of the lug nut when tightening the same on a stud. It has also been found that rough machined and textured surfaces increase the locking effect on the lug nut.

FIGS. 28 and 29 illustrate still another modified form of insert 180 which is constructed in accordance with and embodying the present invention. The insert 180 is similar in construction to the previously described insert 38, except that the insert 180 includes a somewhat concavely shaped body section 182 having a circular upper opening 184 and a lower opening 186, as shown in FIG. 28. The body section 182 is bowed slightly outwardly as shown. In addition, a ring flange 188 is formed on the upper end of the body section 182 adjacent to the upper end 184. This ring flange 188 could adopt any of the form of ring flanges previously described in connection with the other embodiments of the inserts.

The body section 182 is effective in that it creates a tight fitting engagement with a conically shaped seating surface in a stud-receiving opening as soon as it is forced into that stud-receiving opening. In this case, the actual bowing outwardly of the body section 182 operates much in the same manner as the deflection of the previously described inserts when a lug nut is tightened against the interior conically presented surface of the body section.

The tooled or rough surface between the lug nut and the insert as shown in FIGS. 26 and 27 produces a wedging effect and thereby creates a very effective locking action. It should be understood, however, in connection with the present invention, that this tooled section, including the helically shaped thread 168 or the plurality of ridges 172 could be used in any of the previously described inserts of the present invention. The tooled surface as shown, when in a helical form, such as a left spiralling thread, will cause the lug nut to tighten in the insert as the lug nut starts to unwind. Further, the insert could also provide that Belleville spring locking action as previously described in combination with this tooled surface on the insert.

The inserts of the present invention, as for example, those in FIGS. 10, 21 and 24, which have serrations on their surface also provide an effective locking action as previously described. Moreover, they are effective in that they allow for much broader tolerances than some of the other inserts of the present invention. In addition, the serrations on the edge of the ring flanges will prevent rotation of the insert.

One of the important aspects of the present invention which may not be immediately apparent from a review of the drawings, is the fact that these inserts will not change the location of the stud-receiving opening in a vehicle wheel due to eccentricity which might exist between the insert and the stud-receiving cavity of the wheel which receives that insert, as well as the surface that the lug nut seats against. The inserts of the prior art were rigid and non-yieldable and hence, were not capable of any significant deflection in order to allow conformance to the seating surface of the stud-receiving opening and to maintain concentricity between the stud-receiving opening and the insert itself.

The lack of concentricity between the insert and the stud-receiving opening of the wheel generated several disadvantages in terms of balancing of the wheel. In the prior art, when an insert was eccentrically located with respect to the stud-receiving opening, the wheel was not properly balanced. Moreover, and because of the same problem, it was difficult to properly tighten the wheel on the studs.

Because the inserts of the invention are stamped, meeting of design specifications does not increase the overall cost thereof. The inserts of the invention have essentially no concentricity error between the seating surface in the wheel and the surface that the lug nut seats against, and this is due to the fact that the insert is formed from rolled thin sheet metal. In short, the insert provides a complete bearing surface against the aluminum or magnesium seat and does not change a hole location. This is due to the fact that the body of the insert is very conformant as a result of being made from relatively thin sheet metal with a constant cross section. Further, the serrated flange and particularly a serrated end wall of the flange, will allow the insert to move in the stud-receiving opening such that the insert will conform precisely to the center line of the stud-receiving opening. This will allow the wheel to locate correctly with respect to the mounting studs on the wheel hub of the vehicle.

The prior art inserts, when made with a punch and die arrangement, often times inherently lack a possibility of concentricity with a particular stud arrangement of a vehicle. This is due to the fact that the insert is actually formed with a controlled high intensity impact where the insert is essentially formed with approximately one hundred to one hundred fifty tons of force. With this amount of force controlling the impact which forms the insert, there must be a precise alignment of the tool with the insert. Moreover, temperature control is also quite important during the formation of the insert. If all conditions are not properly met, it is impossible to precisely form the insert. However, as indicated previously, the inserts of the present invention do not suffer from this disadvantage.

The inserts which are constructed in accordance with prior art techniques and which are typically formed on headers, screw machines and the like, usually have a thickness which varies. Nevertheless, the prior art inserts have a thickness which is substantially greater and may be in the order of two to three times as thick as the inserts of the present invention. Moreover, and due to the increased metal, they also have a substantially greater weight.

In the present invention, the frusto-conical portion of the insert or seating portion of the insert typically has an overall cross sectional thickness of approximately forty seven mils (0.047 inches) for passenger automobiles. In many cases, it can be as thick as one hundred twenty five mils but rarely ever exceeds a thickness of one hundred twenty five mils for passenger automobiles. The overall thickness of the insert will vary to some extent depending on whether the insert is used in a truck wheel or an automotive passenger wheel. Typically, and in many cases, the insert wall thickness, and particularly in the seating section, could range from about 40 mils (0.04 inches) to about 125 mils for passenger automobiles and for use in a truck, such as an eighteen wheeler truck, the insert seating section can have a wall thickness between 60 mils to about 175 mils. With regard to most passenger automobiles, a typical insert wall thickness is about 0.047 mils. However, it should be understood that the above-defined ranges are generally those which have been found to be applicable. In the case of trucks, depending upon the size of the vehicle and the size of the lug nut, as well as the amount of torque required, the insert could be either thicker or formed of a thinner wall construction.

The insert of the present invention provide a better clamping force, that is, a better clamping action when the lug nut is tightened on a stud and also they enable a more consistent torque-tension curve when a lug nut is tightened thereagainst. In other words, the same clamping force is provided when the insert is used, even on a plated surface. By installing the insert after the wheel is plated, the insert provides a consistent surface against which the lug nut may be tightened.

The inserts of the present invention also have an overall height or length which is less than the prior art inserts, almost by virtue of the fact that they have no depending skirt. As a result, there is no skirt to project beyond the stud-receiving opening. In many prior art arrangements, unless the overall length of the skirt, was precisely controlled, a lower edge of the skirt would project through the stud-receiving opening. As a result, the lug nut would not effectively clamp the wheel on the hub of the vehicle. Rather, if the skirt projected through the stud-receiving opening, the lug nuts would effectively clamp the wheel. In the wheel. In addition, notwithstanding this failure of properly securing the wheel, it was always the possibility that the skirt could knock the insert out of the stud-receiving opening, particularly when a wheel was heaved onto the studs. This condition would be illustrated in FIGS. 6A and 6B if the dimension X-1 were smaller than the dimension of X-2.

The inserts of the invention are also effective due to the ease of their installation. Very little force is required to install the insert in the stud-receiving opening due to the fact that the flange is yieldable somewhat. This is a result of forming the insert out of a sheet metal material which is relatively thin and light in weight. As a result, the flange can yield slightly to fit within the stud-receiving opening. In addition, the tightening of the lug nut expands the flange which further locks the insert into the wheel. A conventional insert formed in a forging or machining operation clearly does not have this yieldability and does not have the "one-way action" provided by the inserts of the present invention. Therefore, the prior art inserts do not become more secure within the stud-receiving opening after a lug nut is tightened thereagainst.

In the case of conventional inserts, if one of the inserts in a wheel was missing, a lug nut used at the stud-receiving opening with the missing insert would not properly seat and as a result, may provide reduced securing action. Thus, if five studs were used on a wheel hub and an insert was missing from one of the stud-receiving openings, then the remaining four studs would primarily provide the locking force for holding the wheel onto the hub.

It can be seen in accordance with the above-identified construction that the pressing of the insert into a stud-receiving opening will not cause stress cracks in the insert due to its relatively thin cross-sectional thickness. Consequently, overpressing of the inserts during installation will not materially damage the insert. In addition, the consistency in wall thickness of the insert, as described above, effectively precludes any changes in the bolt hole centerline. This will prevent off-center bolt hole patterns which was prevalent in the prior art inserts.

Thus, there has been illustrated and described unique and novel inserts and locking elements therefore for mounting non-ferrous vehicle wheels to a vehicle hub. The various forms of inserts include a means for securing the same within the vehicle wheels and providing a biasing action on the locking elements and thereby fulfill all of the objects and advantages which have been sought. It should be understood that many changes, modifications, variations and other uses and applications will become apparent to those skilled in the art after considering this specification and the accompanying drawings. Therefore, any and all such changes, modifications, variations and other uses and applications which do not depart from the spirit and scope of the invention are deemed to be covered by the invention.

Having thereby described my invention, what I desire to claim and secure by Letters Patent is:

1. An insert for use in stud-receiving openings of metal vehicle wheels and which openings each have a seat at an outer end thereof and a diametrically enlarged shoulder-forming wall surrounding the seat, said insert comprising:
   a) a continuous circularly shaped body section adapted for fitted disposition in the seat of a stud-receiving opening of a non-ferrous vehicle wheel;
   b) said body section terminating in a circular upper opening distal to the vehicle wheel and having an arcuate upwardly opening lug nut receiving cavity and an arcuate lower opening proximate to the wheel without any skirt connected to the body section and sized to allow a stud to extend therethrough;
   c) said lug nut receiving cavity being sized to accommodate a locking head associated with a stud extending through the stud-receiving opening and allowing the head to bear against an interior surface of said lug nut receiving cavity of said body section; and
   d) a circular ring flange at the upper opening extending around the upper opening and radially outwardly from an exterior surface of said body section to engage the diametrically enlarged shoulder-forming wall surrounding the lug nut receiving cavity to retentively hold the insert in the stud-receiving opening, said circular ring flange constituting the primary effective locking means for locking the insert in the stud-receiving opening.

2. The steel insert of claim 1 further characterized in that said circular ring flange is integral with said body.

3. The steel insert of claim 1 further characterized in that said ring flange is sized to sit upon a seat formed by the shoulder-forming wall surrounding said stud-receiving opening.

4. The steel insert of claim 3 further characterized in that said ring flange has an outer end wall lying in a plane generally parallel to an axial centerline passing through the body section and the upper and lower openings thereof and being engagable with said shoulder-forming wall to tightly hold the insert in the stud-receiving opening.

5. The insert of claim 1 further characterized in that said insert is formed of a stampable sheet metal so that it has sufficient yieldability to flex and bear against the seat when a locking head bears against the insert and thereby further lock the insert in the stud-receiving opening.

6. The insert of claim 5 further characterized in that said locking head is a lug nut.

7. The insert of claim 1 further characterized in that the seat is conically shaped.

8. The insert of claim 1 further characterized in that the seat is cylindrically shaped.

9. The insert of claim 1 further characterized in that the insert has only a body section and a ring flange and no skirt thereon.

10. The insert of claim 1 further characterized in that the insert is a steel insert and is used with a non-ferrous metal vehicle wheel.

11. The insert of claim 2 further characterized in that the circular ring flange has an outer end wall to tightly engage the diametrically enlarged shoulder-forming wall and where the flange is perpendicular to an axial centerline passing through the insert.

12. The insert of claim 2 further characterized in that the circular ring flange has an outer end wall to tightly engage the diametrically enlarged shoulder-forming wall and where the flange is located at an acute angle with respect to an axial centerline passing through the insert.

13. The insert of claim 2 further characterized in that the circular ring flange has an outer end wall adapted to engage the enlarged shoulder-forming wall and which is provided with a sharp upward edge and chamfered lower edge.

14. The insert of claim 2 further characterized in that the circular ring flange has an outer end wall adapted to engage the enlarged shoulder-forming wall and which is provided on its outer end wall with a plurality of sharp projecting points.

15. The insert of claim 1 further characterized in that the insert is provided with a plurality of knurled elements on an interior surface of the body section.

16. An assembly comprised of an insert for a vehicle wheel stud-receiving opening and a lug nut for mounting a metal vehicle wheel onto a stud extending between and outwardly from a wheel hub of the vehicle and through a stud-receiving opening of the wheel, and where the stud-receiving opening has a seat portion at the outer and thereof and a diametrically enlarged shoulder-forming wall surrounding the seat, said assembly comprising:
   a) an insert having a circularly shaped body fitted within a cylindrically shaped elongate portion of the stud-receiving opening, said body having a seat shaped exterior surface with a portion thereof which engages and generally conforms to an interior surface of a circularly shaped seat of the stud-receiving opening, said body also having a circularly shaped interior fastener head receiving surface;
   b) a lug nut having a tool-receiving section and a tapered section extending downwardly from said tool-receiving section, said tapered section and having a surface sized to extend into and bearing against circularly shaped interior fastener head receiving surface of said insert body; and
   c) said insert being formed of a material which is harder than that of the wheel and also being formed of a sufficiently small cross sectional thickness so that it has properties enabling it to deflect slightly under pressure, and when said insert is subjected to the force of a fastener head bearing against the interior fastener head receiving surface of the insert while being tightened on the stud the fastener head will cause the insert to tightly engage the seat of the stud-receiving opening.

17. The assembly of claim 16 further characterized in that a portion of the body of the insert is deflected so that the exterior surface of the insert bears against the interior surface of the circularly shaped seat of the stud-receiving opening.

18. The assembly of claim 17 further characterized in that the fastener head is a lug nut and the deflection of the insert is caused by a lower portion of a tool-receiving section of the lug nut bearing against the insert.

19. The assembly of claim 16 further characterized in that the body of the insert is provided with a circularly shaped ring flange which engages a shoulder-forming wall surrounding the seat of the stud-receiving opening and tightly engages the shoulder-forming wall.

20. The assembly of claim 16 further characterized in that the circularly shaped body of the insert has a conically shaped body wall which fits within a frusto-conically shaped seat of the stud-receiving opening and that the conically shaped body of the insert has an angle of taper different from the angle of taper of the frusto-conically shaped seat of the stud-receiving opening.

21. The assembly of claim 16 further characterized in that the metal vehicle wheel is a non-ferrous vehicle wheel.

22. The assembly of claim 21 further characterized in that the insert is formed of a steel material.

23. A wheel arrangement for mounting a metal vehicle wheel to a wheel hub of a vehicle, said arrangement comprising:
  a) a metal vehicle wheel having a wheel body and a plurality of stud-receiving openings with each located to receive a stud extending between the wheel and a wheel hub of a vehicle, each stud-receiving opening having:
    1) a conically shaped seating section with an interiorly presented conically shaped side wall,
    2) a cylindrically shaped section with an interiorly presented cylindrically shaped wall; and
    3) a shoulder-forming wall surrounding each conically shaped seating section;
  b) a wheel insert for each said stud-receiving opening and being fitted into and retentively retained in the conically shaped section of the stud-receiving openings, each said wheel insert being formed of a relatively thin-walled stampable sheet metal and which is capable of deflecting slightly when a force is applied thereto, each said insert comprising:
    1) a conically shaped body adapted to substantially conform to the conically shaped seating section of the stud-receiving opening and having a portion which engages a portion of the conically shaped seating section of the stud-receiving opening,
    2) said conically shaped body further having:
      i) a conically shaped exterior wall facing the interiorly presented conically shaped side wall of the stud-receiving opening, and
      ii) a conically shaped interior wall,
    3) an outer opening on said conically shaped body distal to said vehicle wheel and an inner opening on said conically shaped body proximate to said wheel and which openings are sized to receive a stud extending through the insert,
    4) a circular ring flange at said outer opening and having a peripheral annular end wall engaging the shoulder-forming wall and providing the primary locking force for holding the insert in the stud-receiving opening; and
  c) a locking head at the outer end of each stud projecting through a stud-receiving opening and the wheel insert therein, each said locking head having an element which engages the interiorly presented surface of the conically shaped body of the insert and causes deflection of and forces the conically shaped exterior surface of the wheel insert body into tight contact with the interiorly presented conically shaped side wall of the stud-receiving opening causing a further locking of the insert body in the stud-receiving opening.

24. The wheel arrangement of claim 23 further characterized in that said locking head is a lug nut threaded on the stud and which has a tool-receiving section and a tapered section extending downwardly from said tool-receiving section, said tapered section being conically shaped and having a surface sized to extend into and conforming to the interior conically shaped surface of said insert body.

25. The wheel arrangement insert of claim 23 further characterized in that the annular end wall of said ring flange lies in a plane generally parallel to the axial centerline passing through the body section and the upper and lower openings thereof.

26. The wheel arrangement of claim 23 further characterized in that the vehicle wheel is a non-ferrous vehicle wheel.

27. The wheel arrangement of claim 26 further characterized in that the insert is made of steel.

28. A non-ferrous wheel arrangement for mounting a metal but non-ferrous vehicle wheel to a wheel hub of a vehicle and maintaining fairly precise concentricity between inserts in the wheel and studs for securing the wheel and stud-receiving openings in the wheel, said arrangement comprising:
  a) a non-ferrous vehicle wheel having a wheel body and a plurality of stud-receiving openings with each located to receive a stud extending between a wheel and a wheel hub of a vehicle, each stud-receiving opening having:
    1) a circularly shaped seating section with an interiorly presented circularly shaped seating wall, and
    2) a cylindrically shaped side wall section with an inwardly presented cylindrically shaped wall;
  b) a wheel insert for each said stud-receiving opening and being fitted into and retentively retained in the circularly shaped seating section of the stud-receiving openings, each said wheel insert being formed of a thin walled stamped sheet metal which is somewhat yieldable when a force in applied thereto tending to deflect a portion thereof, each said wheel insert further comprising:
    1) a circularly shaped body adapted to substantially conform to the circularly shaped seating section of the stud-receiving opening and having a portion which engages a portion of the circularly shaped seating section of the stud-receiving opening,
    2) said circularly shaped body further having:
      i) a circularly shaped exterior wall facing the interiorly presented circularly shaped seating wall of the stud-receiving opening, and
      ii) a circularly shaped interior wall,
    3) upper and lower openings sized to receive a stud extending through the insert,
    4) a circular ring flange surrounding the upper opening of the body providing a primary locking force to hold the insert in the opening; and c) a locking head on an outer end of each stud projecting through a stud-receiving opening and the wheel insert therein, each said locking head having an element which engages the circularly shaped interior wall of the circularly shaped body of the insert and forces the circularly shaped exterior wall of the wheel insert body into contact with the interiorly presented seating surface of the stud-receiving opening, said insert body being sufficiently yieldable and said ring flange also being sufficiently yieldable such that the insert will become concentrically aligned in the stud-receiving opening so that an axial centerline passing through the insert an axial centerline passing through the stud-receiving opening and an axial centerline passing through the stud all become co-axial.

29. The non-ferrous wheel arrangement of claim 28 further characterized in that said ring flange sits on a shoulder area formed by a shoulder-forming wall surrounding the seating section of the stud-receiving opening.

30. The non-ferrous wheel arrangement of claim 29 further characterized in that said ring flange lies in a plane generally parallel to an axial centerline passing through the body section and the upper and lower openings thereof.

31. The insert of claim 28 further characterized in that the insert has a wall thickness ranging from about 0.040 to about 175 mils.

32. The insert of claim 28 further characterized in that the insert has a wall thickness of approximately 47 mils.

33. The insert of claim 24 further characterized in that further characterized in that the insert has a wall thickness of from about 0.40 to about 125 mils.

34. An insert for use in stud-receiving openings of vehicle wheels, said insert comprising:

a) a continuous circularly shaped body section adapted for fitted disposition in the circularly shaped seat of a stud-receiving opening of a non-ferrous vehicle wheel;

b) said body section terminating in a circular upper opening distal to a wheel hub and providing an interior seating surface for a lug nut and a lower circular opening proximate to a wheel hub to allow a vehicle stud to extend therethrough;

c) said upper opening being sized to accommodate a lug nut to be secured to a stud extending through the openings and allowing the lug nut to bear against the interior surface of said body section;

d) a serrated section on the interior seating surface for receiving the lug nut and which serrated surface area has lines of serration which extend in a direction opposite to the direction of rotation of the lug nut for locking on a stud; and e) a circular ring flange at the upper opening extending around the upper opening and radially outwardly from an exterior surface of said body section to engage a shoulder surrounding the stud-receiving opening and aid in retentively holding the insert in the stud-receiving opening.

35. The insert of claim 34 further characterized in that said serration section comprises a spiral helical ridge.

36. The insert of claim 34 further characterized in that said serrated section comprises a plurality of spaced apart ridges.

37. The insert of claim 34 further characterized in that said ring flange has an arcuately shaped outer annular surface and which provides the primary locking force for holding the insert in the stud-receiving opening.

38. The insert of claim 37 further characterized in that said insert is formed in a stamping operation and having a relatively thin wall thickness such that it is capable of deflecting slightly when inserted in a stud-receiving opening and has substantially less weight than a forged steel insert.

39. The insert of claim 34 further characterized in that the insert has a constant wall thickness ranging from about 40 mils to about 175 mils.

40. The insert of claim 34 further characterized in that the insert has a wall thickness of approximately 47 mils.

41. The insert of claim 37 further characterized in that the insert is used with non-ferrous vehicle wheels and that the insert is formed of a ferrous material.

42. An insert for use in stud-receiving openings of vehicle wheels, said insert comprising:

a) a continuous circularly shaped body section adapted for fitted disposition in the circularly shaped seat of a stud-receiving opening of a non-ferrous vehicle wheel;

b) said body section terminating in a circular upper opening distal to a wheel hub and providing an interior seating surface for a lug nut and a lower circular opening proximate to a wheel hub to allow a vehicle stud to extend therethrough;

c) said upper opening being sized to accommodate a lug nut to be secured to a stud extending through the opening and allowing the lug nut to bear against the interior seating surface of said body section;

d) a circular ring flange at the upper opening extending around the upper opening and radially outwardly from an exterior surface of said body section to engage a shoulder surrounding the stud-receiving opening and aid in retentively holding the insert in the stud-receiving opening; and e) said body section having a relatively constant cross sectional thickness throughout its entire surface area.

43. The insert of claim 42 further characterized in that said ring flange has a relatively constant cross sectional thickness throughout its surface area and which is the same as that of the body section.

44. The insert of claim 43 further characterized in that a serrated section is on the interior seating surface for receiving the lug nut and which serrated surface area has lines of serration which extend in a direction opposite to the direction of rotation of the lug nut for locking on a stud.

45. The insert of claim 42 further characterized in that said ring flange has an arcuately shaped outer annular surface and which provides the primary locking force for holding the insert in the stud-receiving opening.

46. The insert of claim 42 further characterized in that said insert is steel and is formed in a stamping operation and having a relatively thin wall thickness such that it is capable of deflecting slightly when inserted in a stud-receiving opening and has substantially less weight than a forged steel insert.

47. The insert of claim 46 further characterized in that the insert has a constant wall thickness ranging from about 40 mils to about 175 mils.

48. The insert of claim 46 further characterized in that the vehicle wheel with which the insert is used is formed of a non-ferrous material.

49. An insert for use in stud-receiving openings of vehicle wheels, said insert comprising:

a) a continuous conically shaped body section adapted for fitted disposition in the conically shaped seat of a stud-receiving opening of a vehicle wheel;

b) said body section termination in a circular upper opening distal to a wheel hub and providing a conically shaped interior seating surface for a lug nut and a lower circular opening proximate to a wheel hub to allow a vehicle stud to extend therethrough;

c) said upper opening being sized to accommodate a lug nut to be secured to a stud extending through the opening and allowing the lug nut to bear against the interior seating surface of said body section;

d) a circular ring flange at the upper opening extending around the upper opening and radially outwardly from an exterior surface of said body section to engage a shoulder surrounding the stud-receiving opening and aid in retentively holding the insert in the stud-receiving opening; and e) an outer wall on said body section and having an angle relative to its axial centerline which is substantially the same as the angle of the wall forming the seating surface relative to the axial centerline.

50. The insert of claim 49 further characterized in that said body has a constant wall thickness throughout its entire surface area.

51. The insert of claim 49 further characterized in that a serrated section is on the interior seating surface for receiving the lug nut and which serrated surface area has lines of serration which extend in a direction opposite to the direction of rotation of the lug nut for locking on a stud.

52. The insert of claim 49 further characterized in that said angle is approximately 90 degrees.

53. The insert of claim 50 further characterized in that said ring flange has an arcuately shaped outer annular surface and which provides the primary locking force for holding the insert in the stud-receiving opening.

54. The insert of claim 53 further characterized in that said insert is formed in a stamping operation and having a relatively thin wall thickness such that it is capable of deflecting slightly when inserted in a stud-receiving opening and has substantially less weight than a forged steel insert.

55. The insert of claim 49 further characterized in that the insert has a constant wall thickness ranging from about 40 mils to about 175 mils.

56. An assembly comprised of an insert for disposition in a vehicle wheel stud-receiving opening and a lug nut for mounting the metal vehicle wheel onto a stud extending outwardly from a wheel hub of the vehicle and through a stud-receiving opening of the wheel, and where the stud-receiving opening has an inner end facing the hub of the vehicle and a seat portion at an outer end thereof, said assembly comprising:

a) an insert having a circularly shaped body fitted within a cylindrically shaped portion of the stud-receiving opening and the body having a seat-shaped exterior surface with a portion which engages and conforms to a circularly shaped seat of the stud-receiving opening, the overall length of the insert being less than the distance between the seat portion of the stud-receiving opening and the inner end thereof, such that no portion of the insert extends beyond the inner end of the stud-receiving opening;

b) a lug nut having a nose portion sized to bear against the insert;

c) said insert having a length measured from the outer end of the circularly shaped body to the inner end of the insert and which is less than the dimension between the seat portion of the stud-receiving opening and the inner end thereof facing the wheel hub such that no portion of the insert extends beyond the stud-receiving opening and where the diametral size of the inner end of the stud-receiving opening is less than an inner diameter of the insert.

57. The insert of claim 56 further characterized in that the insert is formed of a steel material and the lug nut is formed of a steel material.

* * * * *